(12) United States Patent
Wang et al.

(10) Patent No.: US 12,496,613 B2
(45) Date of Patent: Dec. 16, 2025

(54) COATING COMPOSITIONS AND RELATED METHODS

(71) Applicant: AXALTA COATING SYSTEMS IP CO., LLC, Wilmington, DE (US)

(72) Inventors: Shih-Wa Wang, Glen Mills, PA (US); Petra Stoffel, Cologne (DE); Michael S. Wolfe, Wilmington, DE (US); Matthias Baltrusch, Nordrhein-Westfalen (DE); Michael R. Koerner, Media, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 18/601,911

(22) Filed: Mar. 11, 2024

(65) Prior Publication Data
US 2024/0299974 A1    Sep. 12, 2024

Related U.S. Application Data

(60) Provisional application No. 63/489,694, filed on Mar. 10, 2023.

(51) Int. Cl.
*B05D 1/02*    (2006.01)
*B05D 7/00*    (2006.01)
*C09D 7/43*    (2018.01)

(52) U.S. Cl.
CPC .............. *B05D 1/02* (2013.01); *B05D 7/532* (2013.01); *C09D 7/43* (2018.01); *B05D 2401/20* (2013.01)

(58) Field of Classification Search
None
See application file for complete search history.

(56) References Cited

U.S. PATENT DOCUMENTS

| | | |
|---|---|---|
| 6,861,495 B2 | 3/2005 | Barsotti et al. |
| 7,824,015 B2 | 11/2010 | Pauly |
| 8,091,987 B2 | 1/2012 | Van Den Bergen |

(Continued)

FOREIGN PATENT DOCUMENTS

| | | |
|---|---|---|
| EP | 4074782 A1 | 10/2022 |
| WO | 2018206309 A1 | 11/2018 |

(Continued)

*Primary Examiner* — Michael P. Rodriguez
(74) *Attorney, Agent, or Firm* — Ingrassia Fisher & Lorenz, LLP

(57) ABSTRACT

A method of preparing a coated article is disclosed. The method includes providing a substrate bearing a partially-dehydrated aqueous coating layer. The method further includes providing a coating composition to a high transfer efficiency applicator, the high transfer efficiency applicator comprising a plurality of nozzles each being configured to apply a stream of the coating composition to a substrate substantially without atomization. The coating composition is a waterborne fluid that exhibits a near-Newtonian viscosity profile, and comprises a binder, a crosslinker, and a thickener. The method further includes applying the coating composition to the substrate with the high transfer efficiency applicator via disposing a plurality of lines of the coating composition onto the partially-dehydrated aqueous coating layer of the substrate via the plurality of nozzles, thereby forming an overspray free coating layer thereon.

20 Claims, 11 Drawing Sheets

(56) References Cited

U.S. PATENT DOCUMENTS

2004/0217202 A1 11/2004 Hynes
2009/0304936 A1 12/2009 Nakazawa
2015/0375258 A1 12/2015 Fritz et al.

FOREIGN PATENT DOCUMENTS

| WO | 2022076269 A1 | 4/2022 | |
|---|---|---|---|
| WO | WO-2022076276 A2 * | 4/2022 | ......... C08G 18/0823 |
| WO | 2023034764 A1 | 3/2023 | |

* cited by examiner

COATING COMPOSITIONS AND RELATED METHODS

CROSS-REFERENCE TO RELATED APPLICATION

This claims priority to U.S. Provisional Application No. 63/489,694, filed Mar. 10, 2023, the content of which is incorporated herein by reference.

FIELD OF THE DISCLOSURE

The present disclosure generally relates to waterborne coating compositions and, more specifically, to waterborne overspray free coating compositions and systems and methods for preparing overspray free coatings therewith.

BACKGROUND

Ink jet printing is a non-impact printing process in which droplets of ink are deposited on a substrate, typically paper or textile fabrics, in response to an electronic signal. A specific application of this process, digital printing, allows for precise tailoring to individual requirements. The drops can be jetted onto the substrate by a variety of inkjet application methods including continuous and drop-on-demand printing. In drop-on-demand printing, the energy to eject a drop of ink can be from a thermal resistor, a piezoelectric crystal, acoustic or a solenoid valve. These methods use high transfer efficiency applicators.

In the automotive industry, a vehicle body is typically covered with a series of finishes each having a particular function, including an electrocoat, a primer, a colored basecoat providing the color and a clear topcoat to provide addition protection and a glossy finish. Currently, most automobile bodies are painted in a single color with the basecoat being applied in a single spray operation. The coating is applied with pneumatic spray or rotary equipment producing a broad jet of paint droplets with a wide droplet size distribution. This has the advantage of producing a uniform high-quality coating in a relatively short time by an automated process.

However, this process has a number of disadvantages. If the vehicle body is to be painted with multiple colors, for example if a second color is used for a pattern such as a stripe, or if a whole section of the vehicle body such as the roof is painted a different color, this requires masking the first coating and then passing the vehicle body through the paint spray process a second time to add the second color. After this second paint operation the masking must be removed. This is both time-consuming and labor-intensive adding significant cost to the operation.

A second disadvantage of the current spraying technology is that the drops of paint are sprayed in a wide jet of droplets which has a wide range of droplet sizes. As a result, many of the droplets do not land on the vehicle, either because they are sprayed near the edges and so overspray the substrate, or because the smaller droplets have too low a momentum to reach the vehicle body altogether. This excess overspray must be removed from the spray operation and disposed of safely, leading to significant generation of waste and also additional cost for wasted materials, clean up, disposal, etc.

Applying coatings using a high transfer efficiency applicator may provide a solution for applying two colors to a vehicle and for minimizing overspray by generating drops of a uniform size that can be directed to a specific point on the substrate, e.g. a specific location on the vehicle body, thus minimizing, or completely eliminating oversprayed droplets. In addition, digital printing can be used to print patterns or two tones on a vehicle body, either as a second color digitally printed on the top of a previously sprayed basecoat of a different color, or directly onto the primed or clear-coated vehicle substrate.

However, conventional inkjet inks have typically been formulated to print on porous substrates such as paper and textiles where the ink is rapidly absorbed into the substrate thus facilitating drying and handling of the substrate shortly after printing. In addition, although the printed articles have sufficient durability for these applications, such as printed text and pictures, or patterned fabrics, the durability requirements of an automotive coating are far greater in terms of both physical durability, such as resistance to abrasion and chipping, and long-term durability to weathering and light resistance. Furthermore, ink jet inks known in the art are formulated to have a low and generally shear-rate independent, or Newtonian, viscosity, typically below 20 cps. Such viscosity profiles are selected because of the limited amount of energy available in each nozzle of a printhead to eject a drop of ink, and also to avoid thickening of the ink in the channels of the printhead (e.g. from shear), which can lead to clogging.

By contrast, automotive coatings typically have significant non-Newtonian shear behavior with extremely high viscosity at low-shear to help avoid pigment settling and to ensure rapid and even set-up of the coating immediately after application, but relatively low viscosity at high shear rates to facilitate spraying and atomization of the spray into droplets.

Moreover, even if incumbent technology is suitable for use in some horizontal surface applications, other applications remain, such a vertical surface applications, wherein the incumbent technology sags to unacceptable levels. Since high transfer efficiency applicators demand very low viscosity with limited shear thinning behavior, standard approaches for imparting sag resistance for spray applied coatings cannot be employed.

More specifically, limitations imposed by zero-overspray applicators (continuous streams) or high resolution drop on demand (i.e., "inkjet" printheads) typically require that high shear viscosity be very low. In contrast with spray atomization, because evaporation of solvent does not occur after ejection of the paint from the applicator and prior to impacting the substrate, viscosity buildup does not occur. Consequently, coatings will sag on non-horizontal surfaces. To achieve adequate sag resistance, rheology modifiers must be incorporated at such a high level that, while sag can be prevented, a yield stress prevents flow and leveling resulting in coating defects that are unique to zero overspray applicators. These defects include nozzle line and stripe overlap visibility. The former is due incomplete flow and leveling of streams or droplets emitted from adjacent nozzles resulting in visible and parallel lines in the direction of printhead movement. The latter is a result of application of a second stripe of paint (having width of the nozzle array) adjacent to a previously applied first stripe. While changing the index (distance between adjacent stripes) can improve the coalescence, with the high levels of rheology modifier required to prevent sag, the overlap region exhibits a visible peak or valley that cannot be eliminated by index optimization. In addition, due to particle size limitations for these small nozzle applicators, some rheology control agents cannot be used due to filter and nozzle clogging. Accordingly, there remains opportunity for improvement.

BRIEF SUMMARY

A method of preparing a coated article is provided. The method comprises:
providing a substrate bearing a partially-dehydrated aqueous coating layer thereon;
providing a coating composition for overspray-free application, the coating composition being a waterborne fluid that exhibits a near-Newtonian viscosity profile and a shear viscosity of less than 500 mPa*s at all shear rates from 0.1/s to 10/s, alternatively from 0.1/s to 100/s, and comprises a binder, a crosslinker, and a thickener;
providing the coating composition to a high transfer efficiency applicator, the high transfer efficiency applicator comprising a plurality of nozzles each being configured to apply a stream of the coating composition to the substrate substantially without atomization; and
applying the coating composition to the substrate with the high transfer efficiency applicator via disposing a plurality of lines of the coating composition onto the partially-dehydrated aqueous coating layer of the substrate via the plurality of nozzles, thereby forming an overspray free coating layer thereon.

A coating composition for use in the method is also provided.

A system is also provided. The system comprises a high transfer efficiency applicator supplied with the coating composition.

BRIEF DESCRIPTION OF THE DRAWINGS

The present disclosure will hereinafter be described in conjunction with the following drawing figures, wherein like numerals denote like elements and.

DETAILED DESCRIPTION

Figure 1A:
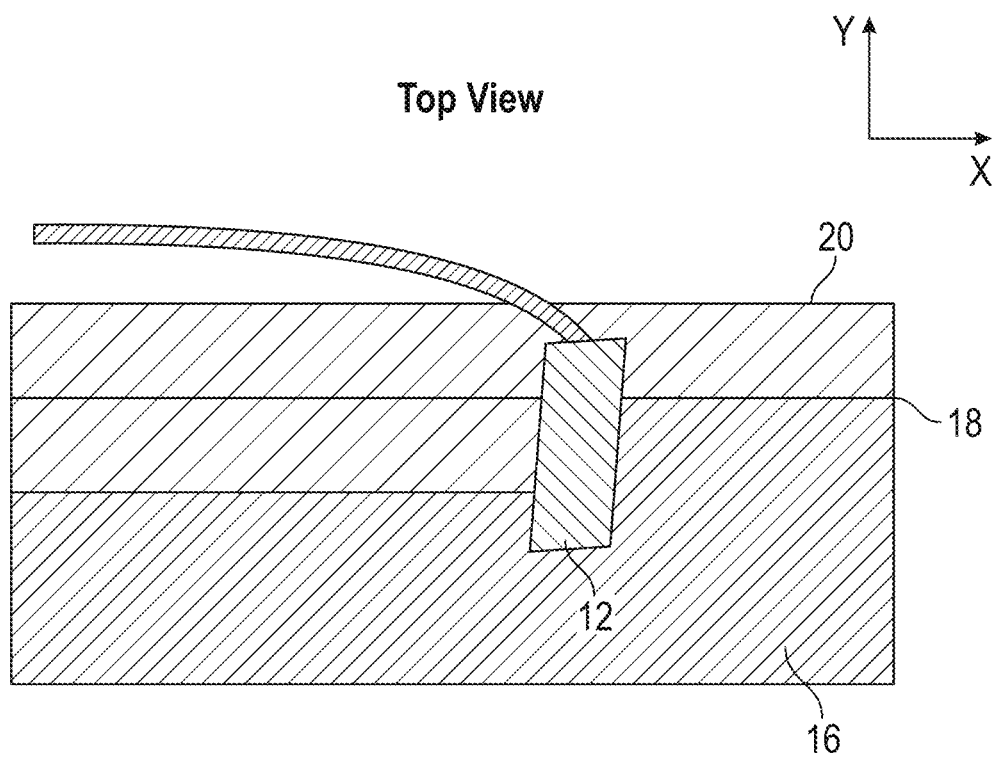
FIG. 1A is a top-view of a high transfer efficiency applicator applying a coating composition to a substrate.

The following detailed description is merely exemplary in nature and is not intended to limit the instant composition or method. Furthermore, there is no intention to be bound by any theory presented in the preceding background or the following detailed description.

In general, the present disclosure provides coating compositions, methods of preparing the coating compositions, methods of applying the coating compositions onto a substrate (e.g. to form a coating thereon), and coated articles prepared by such application methods. The present disclosure further provides devices and systems for carrying out the methods and/or utilizing the coating compositions.

For the sake of brevity, well known conventional techniques related to the compositions, methods, processes, devices, systems, and articles, as well as various portions and components thereof, may be introduced or otherwise set forth in the embodiments herein with varying levels of description. For example, conventional techniques related to formation of the coating compositions may not be described in detail herein, as the various steps in the manufacture of such compositions are well-known and will be readily understood and envisaged by those of skill in the art in view of the embodiments and examples provided herein. Similarly, various tasks and process steps described herein may be incorporated into a more comprehensive procedure or process having additional steps or functionality not otherwise described, e.g. for being well-known and readily appreciated by those of skill in the art. Such conventional steps may only be mentioned briefly or may be omitted entirely without providing well-known process details.

A method of preparing a coated article is provided. The method comprises:
providing a substrate bearing a partially-dehydrated aqueous coating layer thereon;
providing a coating composition for overspray-free application, the coating composition being a waterborne fluid that exhibits a near-Newtonian viscosity profile and a shear viscosity of less than 500 mPa*s at all shear rates from 0.1/s to 10/s, alternatively from 0.1/s to 100/s, and comprises a binder, a crosslinker, and a thickener;
providing the coating composition to a high transfer efficiency applicator, the high transfer efficiency applicator comprising a plurality of nozzles each being configured to apply a stream (e.g. continuous, stream of droplets, or both) of the coating composition to a substrate substantially without atomization; and
applying the coating composition to the substrate with the high transfer efficiency applicator via disposing a plurality of lines of the coating composition onto the partially-dehydrated aqueous coating layer of the substrate via the plurality of nozzles, thereby forming an overspray free coating layer thereon.

The steps and components of the method are described in turn below.

A coating composition suitable for use in the method provided. The coating composition is particularly suitable for overspray-free applications and provides good overlap appearance while maintaining low sag. The coating composition is formulated as a fluid having a near-Newtonian viscosity profile, with a relatively low and substantially shear-independent ("Newtonian") low-shear viscosity, and an even lower and increasingly shear-dependent (non-Newtonian) high-shear viscosity. The particular near-Newtonian viscosity profiles of the coating composition allows for improved overlap performance, while maintaining good sag performance and still being suitable for the jetting requirements of high transfer efficiency applicators. These and other advantages will be understood in view of the embodiments and examples provided herein.

The coating composition is formulated for waterborne application, i.e., is an aqueous composition comprising water as a carrier (e.g. solvent, diluent, etc.). The particular components of the coating composition and desired use/application method will determine the appropriate amount of water to be used. In general, waterborne coating compositions typically comprise from about 30 to about 90 percent by weight (wt. %) of water, based on the total weight of the coating composition. In certain embodiments, the coating composition comprises up to about 30 wt. % of organic solvent(s) as well. Typically, however, the total amount of such organic solvents and other volatile organic compounds (VOC) are targeted to less about 15, alternatively less than about 10 wt. %, based on the total weight of the coating composition.

As described in further detail below, the coating composition is not particularly limited in form ahead of application. The coating composition may be formulated and used as a one-component (i.e., "1K") composition. Alternatively, the coating composition may be a two-component (i.e., "2K") composition.

In general, the coating composition comprises a binder, a crosslinker, and a thickener in addition to the water-based carrier vehicle in which the components are disposed.

The term "binder" is used herein to refer to film-forming components of the coating compositions, which typically comprise one or more polymers (e.g. resins or elastomers), such as acrylic polymers, polyester polymers, polyurethane polymers, polyether polymers, as well as various oligomers and combination thereof. The term "binder" will also be understood to include latex particles and the like, which can be used to prepare the coatings of the present embodiments. As such, the coating composition may include an acrylic polymer, a polyester polymer, a polyester-polyurethane polymer, a latex polymer, a melamine resin, or combinations thereof. It is to be appreciated that other polymers may be included in the coating composition.

Typically, polymers suitable for use in or as the binder comprise a crosslinkable-functional group, such as an isocyanate-reactive group. The term "crosslinkable-functional group" refers to functional groups that are positioned in the oligomer, in the polymer, in the backbone of the polymer, in the pendant from the backbone of the polymer, terminally positioned on the backbone of the polymer, or combinations thereof, wherein these functional groups are capable of crosslinking with crosslinking-functional groups (during the curing step) to produce a coating in the form of crosslinked structures. Typical crosslinkable-functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable-functional groups.

In some embodiments, the binder of the coating composition comprises a resin dispersion that may be, include, consist essentially of, or consist of, a latex, a polyurethane, derivatives thereof, or combinations thereof. Examples of such combinations and derivatives thereof include polyester-polyurethanes, styrene-acrylic latex dispersions, etc. The resin dispersion itself is a system in which distributed particles of one resin materials are dispersed in a continuous phase of another material. The two phases may be in the same or different states of matter. Alternatively, the resin dispersion may be described as an emulsion, which is a uniform mixture of two immiscible liquids. In the instant disclosure, the latex may include a polymer which may be a dispersed phase in a liquid continuous phase such as water. Moreover, the polyurethane may be a dispersed or liquid continuous phase. Alternatively, combinations of the above may be used. If the design dispersion is an emulsion, the emulsion may be any type known in the art, e.g. an o/w emulsion, w/o emulsion, etc. In various embodiments, water, a water-soluble co-solvent, such as any described herein, or a combination of water and one or more of such solvents can be used as a continuous phase wherein a dispersed phase may be the latex, the polyurethane, or combinations thereof.

In various embodiments, the resin dispersion is present in the coating composition an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc. wt. % based on a total weight of the coating composition. In various embodiments, all values and ranges of values, both whole and fractional, including and between the aforementioned values, are hereby expressly contemplated for use herein. In some embodiments, the amounts above refer to wt % solids of the coating composition.

In some embodiments, the binder of the coating composition comprises a resin dispersion that may be, include, consist essentially of, or consist of, the latex. It is contemplated that zero, one, two, three, four, five, or even more individual latexes may be used in the binder, and thus the coating composition. In various embodiments, the terminology "latex" means a dispersion of polymer particles in water. For example, a latex polymer typically requires a secondary dispersing agent (e.g., a surfactant) for creating a dispersion or emulsion of polymer particles in water. The latex is not particularly limited and may be any known in the art.

In some embodiments, the latex includes the reaction product of one or more of the following monomers to form a polymer which may be a dispersed phase and/or a continuous phase. These monomers include (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl (meth)acrylate, isooctyl(meth)acrylate, hydroxyethyl(meth) acrylate, hydroxymethyl(meth)acrylate, hydroxypropyl (meth)acrylate, hydroxyisopropyl(meth)acrylate, hydroxybutyl(meth)acrylate, hydroxyisobutyl(meth)acrylate, tetrahydrofurfuryl(meth)acrylate, combinations of these, and the like.

In some embodiments, the latex may be or include one or more of (meth)acrylated urethanes (i.e., urethane(meth) acrylates), (meth)acrylated epoxies (i.e., epoxy (meth)acrylates), (meth)acrylated polyesters (i.e., polyester(meth)acrylates), (meth)acrylated(meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils.

In some embodiments, the resin dispersion may include a polyester-modified acrylic dispersion containing epoxy groups, such as Daotan® VTW 1686/40WA, which is commercially available from Allnex. In other embodiments, the resin dispersion may include a styrene-acrylic latex dispersion. Such dispersions may be formed by a two-step emulsion polymerization process.

In some embodiments, the latex (e.g. individually or as a whole) is present in an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc. wt. % actives, based on a total weight of the composition.

In some embodiments, the binder of the coating composition comprises a resin dispersion that may be, include, consist essentially of, or consist of, the polyurethane (i.e., a polyurethane dispersion resin). It is contemplated that zero, one, two, three, four, five, or even more individual polyurethanes may be used in the composition. The polyurethane is not particularly limited and may be any known in the art.

In various embodiments, the polyurethane of the polyurethane dispersion resin is the reaction product of a polyol and an isocyanate. Other polyurethanes can be made by first forming an NCO-functional hydrophilic polyurethane prepolymer by addition reaction of polyol type compounds and polyisocyanates, conversion of the so-formed polyurethane prepolymer into the aqueous phase, and then reacting the aqueously dispersed NCO-functional polyurethane prepolymer with an NCO-reactive chain extender like, for example, a polyamine, a hydrazine derivative or water.

As understood by those of skill in the art, the polyurethane may be described in terms of the reaction product of a compound having one or more hydroxyl groups (e.g. a monol, diol, triol, tetrol, or polyol) and an isocyanate. As such, regarding exemplary polyurethanes, those of skill in the art will understand the scope thereof based on examples of such reactive components, e.g. the polyol and the isocyanate, which are used to prepare many suitable polyurethanes for the polyurethane dispersion resin.

The polyol is typically selected from polyester polyols, polyether polyols, and polycarbonate polyols. It is also contemplated that polythioether polyols, polycaprolactones, and acrylic polyols may also be utilized. In particular embodiments, the polyol is further defined as a polyester polyol. In specific embodiments, the polyol is a polyester polyol. In certain embodiments, the polyol is an aromatic polyester or polyether polyol. Examples of other suitable polyols include the polyhydric alcohols describe herein. Monohydric alcohols, such as, for example, butanol, octanol, lauryl alcohol, ethoxylated or propoxylated phenols may also be included along with polyhydric alcohols. Alternatively, low molar mass polyols defined by an empirical and structural formula, such as polyhydric alcohols can be utilized. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized.

The polyol may be derived from a reaction of an initiator and an alkylene oxide. The initiator may include any initiator known in the art. In various embodiment, the initiator is chosen from ethylene glycol, propylene glycol, dipropylene glycol, trimethylene glycol, butane diols, pentane diols, hexane diols, heptane diols, glycerol, 1,1,1-trimethylolpropane, 1,1,1-trimethylolethane, hexane triols, alkyl glucosides, pentaerythritol, sorbitol, diamine naphthalenes, anilines, condensation products of aniline and formaldehyde, alkyl amines, triisopropanolamine, alkylene diamines, diamine alkanes, sucrose, toluene diamine, and combinations thereof.

The alkylene oxide reacted with the initiator to form the polyol may be chosen from ethylene oxide, propylene oxide, butylene oxide, amylene oxide, tetrahydrofuran, alkylene oxide-tetrahydrofuran mixtures, epihalohydrins, aralkylene oxides, and combinations thereof. In some embodiments, the alkylene oxide is chosen from ethylene oxide, propylene oxide, and combinations thereof. However, it is also contemplated that any suitable alkylene oxide that is known in the art may be used.

The polyol itself may include an additional organic functional group, e.g. chosen from a carboxyl group, an amine group, a carbamate group, an amide group, and an epoxy group. The polyol may also include an alkylene oxide cap. If the polyol includes the alkylene oxide cap, the alkylene oxide cap typically includes ethylene oxide, propylene oxide, butylene oxide, amylene oxide, and combinations thereof. More typically, the alkylene oxide cap includes ethylene oxide. If the polyol includes the alkylene oxide cap, the alkylene oxide cap may be less than or equal to 25, such as from 10 to 20 wt. %, based on the total weight of the polyol.

The polyol may also include an addition polymer dispersed therein. More specifically, the polyol may include a dispersion or a solution of addition or condensation polymers, i.e., a graft polyol. The dispersion may include styrene, acrylonitrile, and combinations thereof. The polyol may include an emulsion that includes water or any other polar compound known in the art.

In certain embodiments, low molar mass polyols defined by an empirical and structural formula, such as polyhydric alcohols are utilized to form the polyurethane. Examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In some embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized.

Hydroxyl-functional resins may also be used as the polyol to prepare the polyurethane, as the isocyanate may also be reacted with such a hydroxyl-functional resin. Such resins are not particularly limited and may be any known in the art, such as aliphatic or aromatic dicarboxylic acids, polyols, diols, aromatic or aliphatic cyclic anhydrides and cyclic alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenchexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further examples of suitable polycarboxylic acids can include aromatic and aliphatic polycarboxylic acids, such as phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols (e.g. polyhydric alcohols) can also be used.

The isocyanate is not particularly limited and may be any suitable for use in preparing the polyurethane resin dispersion. The isocyanate may be a mono or polyisocyanate, an aromatic isocyanate, an aliphatic isocyanate, and/or combinations thereof. In some embodiments, the isocyanate is or includes an aromatic isocyanate such as polymeric MDI. If the isocyanate is or includes an aromatic isocyanate, the aromatic isocyanate typically corresponds to the formula R' (NCO)$_z$ wherein R' is a polyvalent aromatic organic radical, and z is an integer that corresponds to the valence of R'. Typically, z is at least two.

Other examples of suitable isocyanates include 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4''-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof.

Modified multivalent aromatic isocyanates may also be used, such as products obtained through chemical reactions of aromatic diisocyanates and/or aromatic polyisocyanates. Examples include polyisocyanates, ureas, biurets, allophanates, carbodiimides, uretonimines, and isocyanurate and/or urethane groups including diisocyanates and/or polyisocyanates such as modified diphenylmethane diisocyanates. The urethane groups of the isocyanate may be formed through reaction of a base isocyanate, as described above, with low molecular weight polyols, etc. as described herein. Likewise, the isocyanate may also include one or more prepolymers including isocyanate groups.

Additional isocyanate examples include modified benzene and toluene diisocyanates, e.g. employed individually or in reaction products with polyoxyalkyleneglycols, diethylene glycols, dipropylene glycols, polyoxyethylene glycols, polyoxypropylenc glycols, polyoxypropylenepolyoxethylene glycols, polyesterols, polycaprolactones, and combinations thereof. In various embodiments, the isocyanate may be an isocyanate chosen from 2,4'-diphenylmethane diisocyanate, 4,4'-diphenylmethane diisocyanate, modified 2,4'-diphenylmethane diisocyanate, modified 4,4'-diphenylmethane diisocyanate, and combinations thereof. The isocyanate composition used to prepare the polyurethane dispersion resin may also include stoichiometric or non-stoichiometric reaction products of the aforementioned isocyanates.

In still other embodiments, examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

Alternatively, the isocyanate may be a liquid polyisocyanate including one or more carbodiimide groups. In various embodiments, crude polyisocyanates may also be used, such as crude toluene diisocyanate obtained by the phosgenation of a mixture of toluenediamines or crude diphenylmethane isocyanate obtained by the phosgenation of crude isocyanates.

It will be appreciated that suitable isocyanates are not particularly limited in NCO content, and typically have an NCO content of from 5 to 35 percent by weight. Determination of the NCO content on percent by weight is accomplished by a standard chemical titration analysis known to those skilled in the art.

In some embodiments, the polyurethane may be a polyester-polyurethane polymer. In other words, the resin dispersion may be a dispersion comprising at least a polyester-polyurethane resin.

The polyester of the polyester-polyurethane polymer may be linear or branched. Useful polyesters can include esterification products of aliphatic or aromatic dicarboxylic acids, polyols, diols, aromatic or aliphatic cyclic anhydrides and cyclic alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenchexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further examples of suitable polycarboxylic acids include aromatic and aliphatic polycarboxylic acids, such as phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable.

Examples of suitable polyesters include branched copolyester polymers. The branched copolyester polymer and process for production described in U.S. Pat. No. 6,861,495, which is hereby incorporated by reference, can be suitable. Polyesters prepared from monomers with multifunctional groups such as AxBy (wherein each of x and y is independently 1 to 3) types including those having one carboxyl group and two hydroxyl groups, two carboxyl groups and one hydroxyl group, one carboxyl group and three hydroxyl groups, or three carboxyl groups and one hydroxyl group can be used to create branched structures. Examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender chosen from a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

The polyester-polyurethane polymer can be produced from the polyester and polyisocyanates. The polyester can be polymeric or oligomeric organic species with at least two hydroxyl-functionalities or two-mercapto functionalities and their mixtures thereof. Polyesters and polycarbonates with terminal hydroxy groups can be effectively used as the diols.

In some embodiments, the resin dispersion comprises a polyester-polyurethane polymer formed from a linear polyester diol resin (reaction product of monomers 1,6-hexanediol, adipic acid, and isophthalic acid) and isophorone diisocyanate. This polyester-polyurethane polymer has a weight average molecular weight of about 30,000, a solids content of about 35 wt %, and a particle size (e.g. Dv50) of about 250 nanometers, as determined using any apparatus known in the art, e.g. a Malvern Mastersizer.

In some embodiments, the resin dispersion comprises a polyester-polyurethane polymer formed from a linear polycarbonate-polyester and isophorone diisocyanate. This polyester-polyurethane polymer has a weight average molecular weight of about 75,000, a solids content of about 35 wt %, and a particle size (e.g. Dv50) of about 180 nanometers, as determined using any apparatus known in the art, e.g. a Malvern Mastersizer.

In some embodiments, the resin dispersion comprises a polyester-polyurethane polymer formed from a slightly branched polyester polyol and hexamethylene diisocyanate, e.g. being about 40 wt % solid.

In some embodiments, the resin dispersion comprises a polyester-polyurethane polymer formed from a linear polyester diol resin (e.g. that is the reaction product of monomers 1,6-hexanediol, adipic acid, and isophthalic acid) and isophorone diisocyanate, e.g. being about 35 wt % solid.

In another embodiment, the polyurethane is chosen from one formed from a branched polyester polyol and hexamethylene diisocyanate; formed from a linear polyester diol resin and isophorone diisocyanate wherein the linear polyester diol is the reaction product of 1,6-hexanediol, adipic acid, and isophthalic acid; formed from a linear polycarbonate-polyester polyol and isophorone diisocyanate; a polyester-polyurethane polymer; and combinations thereof.

In another embodiment, the resin dispersion may be, include, consist essentially of, or consist of, a polyurethane dispersion resin formed from a linear polycarbonate-polyester polyol and isophorone diisocyanate.

In some embodiments, the resin dispersion comprises a polyester-polyurethane polymer having the tradename Bayhydrol® U 241 which is commercially available from Covestro AG of Leverkusen, Germany. The coating composition may include this polyester-polyurethane polymer in an amount of from about 0.1 to about 50, alternatively from about 1 to about 20, or alternatively from about 1 to about 10 wt. %, based on a total weight of the coating composition.

In some embodiments, the resin dispersion includes, consist essentially of, or consists of, the polyurethane as the resin component. In such embodiments, the polyurethane is present in an amount of from about 1 to about 100, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55 wt. % actives based on a total weight of the resin dispersion.

In some embodiments, the polyurethane is present in an amount of from about 1 to about 65, about 1 to about 60, about 1 to about 55, about 1 to about 45, about 1 to about 40, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24 wt. %., weight percent actives based on a total weight of the binder. In various embodiments, this amount is from about 1 to about 15, e.g. of about 1, 2, 3, 4, 5, 6, 7, 8, 9, 10, 11, 12, 13, 14, or 15 wt. % actives, based on a total weight of the binder.

In other embodiments, the polyurethane is present in an amount of from about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20 wt. % actives, based on a total weight of the coating composition. It is to be appreciated that amounts outside the ranges above may also be utilized.

In some embodiments, the binder, alternatively the resin dispersion, comprises an acrylic resin. In general, acrylic resins suitable for the binder include the reaction products of one or more of the following monomers: (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl(meth)acrylate, 2-ethylhexyl(meth) acrylate, lauryl(meth)acrylate, beta-carboxyethyl(meth) acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth) acrylate, dodecyl(meth)acrylate, n-butyl(meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl (meth)acrylate, isooctyl(meth)acrylate, hydroxyethyl(meth) acrylate, hydroxymethyl(meth)acrylate, hydroxypropyl (meth)acrylate, hydroxyisopropyl(meth)acrylate, hydroxybutyl(meth)acrylate, hydroxyisobutyl(meth)acrylate, tetrahydrofurfuryl(meth)acrylate, and the like, as well as derivatives, modifications, and combinations thereof.

In some embodiments, the binder, alternatively the resin dispersion, comprises one or more of (meth)acrylated urethanes (i.e., urethane(meth)acrylates), (meth)acrylated epoxies (i.e., epoxy (meth)acrylates), (meth)acrylated polyesters (i.e., polyester(meth)acrylates), (meth)acrylated (meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth) acrylates, (meth)acrylated oils, and the like, or a combination thereof.

The resin dispersion may also include an amine, which may be any type known in the art, that may or may not react with an isocyanate to form a polyurea. The amine may include primary and secondary aliphatic and/or cyclic aliphatic amines. The amine may include any additional functional group known in the art including, hydroxyl groups, thiol groups, alkyl groups, cyclic groups, aromatic groups, and combinations thereof. It is to be understood that the amine may also include an amide, which also may be any type known in the art. The amide may include or otherwise be present as a polyester amide obtained from polymers of unsaturated or saturated carboxylic acids or anhydrides, and multifunctional unsaturated or saturated amino-alcohols, as well as combinations thereof.

The coating composition includes a crosslinker. The term "crosslinker" refers to a component having "crosslinking-functional groups", i.e., reactive functional groups positioned in each molecule of the compounds, oligomer, polymer, the backbone of the polymer, pendant from the backbone of the polymer, terminally positioned on the backbone of the polymer, or a combination thereof, which are capable of crosslinking with (e.g. covalently bonding to) the crosslinkable-functional groups (e.g. during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures.

The coating composition may include more than one type of crosslinking agent that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

In some embodiments, the coating composition comprises a melamine crosslinker.

Suitable melamine crosslinkers may be melamine resins that are partially or fully etherified with one or more alcohols like methanol or butanol (e.g. hexamethoxymethyl melamine). Examples of other suitable melamine crosslinkers include monomeric melamine, polymeric melamine-formaldehyde resins, and combinations thereof. Monomeric melamines include low molecular weight melamines, e.g. which contain, on an average, three or more methylol groups etherized with a $C_1$ to $C_5$ monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof.

Some suitable monomeric melamines are available commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines.

In various embodiments, the melamine cross-linker is utilized in an amount of from about 1 to about 30, about 2 to about 25, about 5 to about 25, or about 5 to about 20 wt. %, based on the total weight actives in the coating composition. In other embodiments, this amount is from about 1 to about 20, about 1 to about 15, about 1 to about 10, alternatively from about 1 to about 5 wt. %, based on a total weight of the coating composition.

In exemplary embodiments, the coating composition includes as the crosslinker, a melamine-formaldehyde resin having the tradename Cymel® 303, which is commercially available from Cytec Industries Inc. of West Patterson, N.J.

Other crosslinkers may also be utilized in the coating composition. For example, an isocyanate-based crossline may be utilized. Alternatively, both an isocyanate crosslinker and a melamine crosslinker can be used.

Examples of isocyanate crosslinkers are not particularly limited and may be any known in the art. In various embodiments, this isocyanate crosslinker is or includes an aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

In various embodiments, isocyanates such as oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned above with polyhydric alcohols and mixtures thereof can be used as a crosslinker These can react with polyols such as, for example, OH group-containing polyesters, polyethers, acrylates and polyurethane, and mixtures thereof, which polyols may be solvent-based, solvent-free, or water-dilutable. In various embodiments, monofunctional isocyanates are contemplated for use herein, as selected by one of skill in the art. In other embodiments, blocked isocyanates are contemplated for use herein, as selected by one of skill in the art.

Polyisocyanate-functional adducts having isocyanurate structural units can also be used in or as the crosslinker. For example, the adduct of 2 molecules of a diisocyanate, such as hexamethylene diisocyanate or isophorone diisocyanate, and a diol such as ethylene glycol; the adduct of 3 molecules of hexamethylene diisocyanate and 1 molecule of water (commercially available from Bayer Corporation of Pittsburgh, Pennsylvania under the trade name Desmodur® N); the adduct of 1 molecule of trimethylol propane and 3 molecules of toluene diisocyanate (commercially available from Bayer Corporation of Pittsburgh, Pennsylvania under the trade name Desmodur® L); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

In various embodiments, when utilized, the isocyanate cross-linker is present in an amount of from about 1 to about 10, alternatively from about 2 to about 8, alternatively from about 3 to about 6, or about 3, 4, 5, or 6 wt. %, based on the total weight of the coating composition, herein.

The coating composition includes a thickener. In general, it will be understood that the rheological properties of the coating composition can be largely impacts by the selection of the thickener utilized. In general, the thickener is selected from rheology control agents, i.e., rheology modifiers, thixotropic agents, etc. Thickeners may be synthetic or natural, and organic or inorganic. Organic thickeners may be associative, non-associative, or solvent based.

Typically, the thickener is chosen from associative synthetic organic thickeners, synthetic inorganic thickeners, and combinations thereof.

Examples of associative synthetic organic thickeners generally include hydrophobically modified ethoxylated urethane (HEUR), hydrophobically modified alkali swellable emulsion (HASE), epoxy-functionalized polyurethane, epoxy-functionalized acrylic, hydrophobically modified polyacrylate thickener, a hydrophobically modified polyether thickener, and a hydrophobically modified cellulose ether, and others known in the art.

In some embodiments, the coating composition comprises a non-ionic associative HEUR thickener. Suitable HEUR are not particularly limited and may be any known in the art suitable for imparting the rheological profile required of the coating composition. For example, suitable HEUR may be prepared by reacting a polyalkylene glycol, a hydrophobic capping agent and/or a hydrophobic difunctional agent, and a diisocyanate in stoichiometric excess of the total number of isocyanate reactive groups, which form a polyurethane prepolymer with isocyanate functionality. This prepolymer may then be converted to a hydrophobically modified alkylene oxide poly(urethane-urea-allophanate), which may further include additional functionality such as amine functionality.

The HEUR may be utilized in conjunction with, or in the absence of, alkali swellable emulsions or any other class of thickeners.

In various embodiments, the HEUR is present in an amount of from about 0.01 to about 20, about 0.1 to about 20, about 0.1 to about 15, about 0.1 to about 10, about 0.1 to about 5, about 0.1 to about 1, about 0.1 to about 0.9, about 0.2 to about 0.8, about 0.3 to about 0.7, about 0.4 to about 0.6, about 0.5 to about 0.6, about 0.5 to about 10, about 1 to about 9.5, about 1.5 to about 9, about 2 to about 8.5, about 2.5 to about 8, about 3 to about 7.5, about 3.5 to about 7, about 4 to about 6.5, about 4.5 to about 6, about 5 to about 5.5, or about 0.01, 0.02, 0.03 . . . 0.1, 0.2, 0.3 . . . 1, 1.1, 1.2 . . . up to and including about 20 wt. % actives, based on a total weight of the composition. In various embodiments, the HEUR is present in an amount of from about 0.1 to about 10, alternatively from about 0.2 to about 8, alternatively from about 0.2 to about 6 wt. %, based on the total weight of the coating composition.

In some embodiments, the coating composition comprises an inorganic thickener, Examples of such thickeners include comprising a phyllosilicate, also known as "layered silicate". Suitable layered silicate are not particularly limited and may be any known in the art suitable for imparting the rheological profile required of the coating composition.

Layered silicates are typically silicates that include or consist of planar layers of octahedra bound to tetrahedra above and below with a characteristic repeat distance between t-o-t layers. For example, layered silicates may be classified as 7 Å layer silicates, 10 Å layer silicates, and chlorites based on their repeat distances. Minerals within these groups can be further divided into dioctahedral and trioctahedral. 7 Å layer silicates include kaolinite $Al_4(Si_4O_{10})(OH)_8$ (dioctahedral) and serpentine $Mg_6(Si_4O_{10})(OH)$; (trioctahedral). 10 Å layer silicates usually form as weathering product and can exhibit perfect planar cleavage such that they can be known as micas. The group can also include clay minerals. Chlorites include the di- and trioctahedral $Mg_5Al(AlSi_3O_{10})(OH)_8$. In various embodiments, layered silicates include or consist of two-dimensional (2D) layers of two fused silicate tetrahedral sheets with a dimension of approx. 1 nm thick and 100 nm to 1000 nm long and with an edge-shared octahedral sheet of metal atoms such as Mg or Al. In various embodiments, MMT, hectorite, and saponite are commonly used layered silicates.

In certain embodiments, a laponite propylene glycol solution is utilized, which includes a synthetic layered silicate, water, and polypropylene glycol. The synthetic layered silicate is commercially available from Altana AG of Wesel, Germany under the trade name Laponite RD.

In one embodiment, the layered silicate is a synthetic phyllosilicate.

In various embodiments, the layered silicate is present in an amount of from about from about 0.01 to about 10, about 0.1 to about 8, about 0.1 to about 6, about 0.1 to about 5, about 1 to about 5, or about 1 to about 3, wt. % actives, based on a total weight of the composition.

It is also contemplated that the layered silicate may not be used at all. In various non-limiting embodiments, all values and ranges of values, both whole and fractional, including and between the aforementioned values, are hereby expressly contemplated for use herein. Moreover, amounts outside the ranges above may also be utilized.

In some embodiments, a combination of thickener is utilized. In such embodiments, each of the thickeners may be present individually in the amounts listed above, or collectively to a total amount as listed above with respect to any individual class of thickener.

The coating composition can include, or be free of, one or more various components, such as binders, dyes, additional rheology modifiers, carriers, catalysts, conventional additives, or combinations thereof. Conventional additives may include, but are not limited to, dispersants, antioxidants, UV stabilizers and absorbers, surfactants, wetting agents, leveling agents, antifoaming agents, anti-cratering agents, or combinations thereof. In some embodiments, the coating composition comprises one or more of a pigment; a cosolvent; a catalyst; a UV absorber; a leveling additive; a wetting additive; or a combination of any of these.

In some embodiments, the coating composition comprises a pigment. Any pigment known in the art for use in coating compositions may be utilized in the coating composition, so long as the other parameters of the coating composition are achieved.

In various embodiments, the coating composition may include the pigment or be free of the pigment. Any pigment known in the art for use in coating compositions may be utilized in the coating composition. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

The pigment may be alternatively described as an extender pigment. While extender pigments are generally utilized to replace higher cost pigments in coating compositions, the extender pigments as contemplated herein may increase shear viscosity of the coating composition as compared to a coating composition free of the extender pigments. An increase in shear viscosity of the coating composition may improve suitability of the coating composition for application to the substrate utilizing the high transfer efficiency applicator. The extender pigment may have a particle size (e.g. Dv50 as determined using a Malvern Mastersizer) of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, mica, wollastonite, magnesium silicate (talc), barium sulfate, kaolin, and aluminum silicate. In various non-limiting embodiments, all values and ranges of values, both whole and fractional, including and between the aforementioned values, are hereby expressly contemplated for use herein.

The coating composition may include the extender pigment in an amount of from about 0.1 to about 50, alternatively from about 1 to about 20, or alternatively from about 1 to about 10 wt. %, based on a total weight of the coating composition. In other embodiments, the optional pigment is present in an amount of from about 1 to about 50, about 5 to about 50, about 10 to about 45, about 15 to about 40, about 20 to about 35, or about 25 to about 30, weight percent actives based on a total weight of the composition. In other embodiments, the optional pigment is present in an amount of from about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In other embodiments, the optional pigment is present in an amount of from about 0.1 to about 1, about 0.2 to about 0.9, about 0.3 to about 0.8, about 0.4 to about 0.7, about 0.5 to about 0.6, or about 0.1, 0.2, 0.3, 0.4, 0.5, 0.6, 0.7, 0.8, 0.9, or 1.0, weight percent actives based on a total weight of the coating composition. In various non-limiting embodiments, all values and ranges of values, both whole and fractional, including and between the aforementioned values, are hereby expressly contemplated for use herein.

In certain embodiments, the coating composition includes magnesium silicate (talc), barium sulfate, or a combination thereof. In various embodiments, inclusion of barium sulfate as the extender pigment results in a coating composition having greater shear viscosity as compared to inclusion of talc as the extender pigment. In various embodiments, the optional pigment is chosen from Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6, and combinations thereof.

The composition may also include a cosolvent, i.e., any organic or solvent compatible with the aqueous coating composition. Non-limiting examples of suitable organic solvents may include aromatic hydrocarbons; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. In some embodiments, the evaporation rate of the solvent may have an impact on the suitability of the coating composition for printing. Certain co-solvents may be incorporated into the coating composition having increased or decreased evaporation rates thereby increasing or decreasing the evaporation rate of the coating composition. Typically, the coating composition is free from, alternatively substantially free from, volatile organic solvents.

In some embodiments, the cosolvent is chosen from water-soluble solvents. In various embodiments, the water-soluble solvent may be methanol, propanol, butanol, ethanol, 1,2-butanediol, 1,3-butanediol, 1,3-propanediol, 1,4-butanediol, 1,4-dioxane, 1,5-pentanediol, 2-butoxyethanol, 2-propanol, acetaldehyde, acetic acid, acetone, acetonitrile, butyric acid, diethanolamine, diethylenetriamine, dimethoxyethane, dimethyl sulfoxide, dimethylformamide, ethylamine, ethylene glycol, formic acid, furfuryl alcohol, glycerol, methyl diethanolamine, methyl isocyanide, n-methyl-2-pyrrolidone, propanoic acid, propylene glycol, pyridine, tetrahydrofuran, triethylene glycol, glycol ethers (ethylene glycol monobutyl ether, diethylene glycol monobutyl ether, etc., any and all isomers thereof, or combinations thereof. Alternatively, the composition may be free of any one or more of the aforementioned solvents so long as at least one water-soluble solvent is utilized in the composition. In some embodiments, for example, the composition is substantially free from small-chain alcohols.

In various embodiments, the cosolvent, including any one or more of the additional solvents selected for use, is present in an amount of from about 0.1 to about 25, about 0.5 to about 25, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In various non-limiting embodiments, all values and ranges of values, both whole and fractional, including and between the aforementioned values, are hereby expressly contemplated for use herein.

The coating composition may further include a catalyst. The coating composition may further include a catalyst to reduce curing time and to allow curing of the coating composition at ambient or elevated temperatures. The ambient temperatures are typically referred to as temperatures in a range of from about 18° C. to about 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof. The coating composition may include the catalysts in an amount of from about 0.01 to about 5, alternatively from about 0.01 to about 1, or alternatively from about 0.02 to about 0.5 wt. %, based on a total weight of the coating composition.

The coating composition may further include conventional additives. The coating composition may further include an ultraviolet light stabilizer. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin® 123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert·amyl-phenyl)-2H-benzotriazole, 2[2-hydroxy-3,5-di(1,1-dimethylbenzyl)phenyl]-2H-benzotriazole, reaction product of 2-(2-hydroxy-3-tert·butyl-5-methyl propionate)-2H-benzotriazole and polyethylene ether glycol having a weight average molecular weight of 300, 2-(2-hydroxy-3-tert·butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4, 6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis [butyl(1,2,2,6,6-pentamethyl-4-piperidinyl)amino]-1,3,5-triazine-2-yl]imino]-3,1-propanediyl]]bis[N, N''''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl] [2,2,6,6-tetramethylpiperidinyl)-imino]-1,6-hexane-diyl[(2, 2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-2loxo-7-oxa-3,20-diazal dispiro(5.1.11.2)henicosan-20-yl) propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating composition may further include other additives known in the art such as wetting agents, leveling and flow control agents, for example, Resiflow®S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the coating composition can affect the surface tension of the coating composition and thus may have an impact on the suitability of the coating composition for printing. Certain wetting agents, leveling agents, flow control agents, and surfactants may be incorporated into the coating composition for increasing or decreasing the surface tension of the coating composition.

The coating composition is not particularly limited relative to solids content and may have a solids content of from about 5 to about 90, alternatively from 5 to about 80, about 15 to about 70 wt. %, about 15 to about 30, about 10 to about 35, or about 20 to about 25 wt. %, based on a weight of the composition. In other embodiments, the solids content is from about 5 to about 85, about 10 to about 80, about 15 to about 75, about 20 to about 70, about 25 to about 65, about 30 to about 60, about 35 to about 55, about 40 to about 50, or about 45 to about 50 wt. %, based on a weight of the composition. The solids content may be determined in accordance with ASTM D2369-10. In certain embodiments, the higher solids content for the coating composition may be desired due to the coating composition not undergoing atomization utilizing conventional spray equipment.

The coating composition is formulated with a near-Newtonian viscosity profile as described above. In typical embodiments, the coating composition exhibits a shear viscosity of less than 500 mPas at all shear rates from 0.1/s to 10/s, alternatively from 0.1/s to 100/s. In some embodiments, the coating composition exhibits a shear viscosity of from 30 to 500, alternatively from 30 to 200 mPa*s at all shear rates from 0.1/s to 10/s, alternatively from 0.1/s to 100/s.

In some embodiments, the near-Newtonian viscosity profile of the coating composition is defined according to a viscosity ratio between shear viscosities taken at two different shear rates, where a ratio of 1 models a Newtonian profile. In some embodiments, for example, the near-Newtonian viscosity profile of the coating composition is demonstrated by the coating composition exhibiting a ratio of shear viscosity at a shear rate of 0.1/s to shear viscosity at a shear rate of 10/s (i.e., a "viscosity ratio (0.1 s^-1/10 s^-1))" of less than 10, alternatively of less than 8, alternatively of less than 6, alternatively of less than 4, alternatively of less than 3, alternatively of less than 2, alternatively of less than 1.5. In these or other embodiments, the coating composition exhibits a viscosity ratio (0.1 s^-1/100 s^-1), i.e., a ratio of shear viscosity at a shear rate of 0.1/s to shear viscosity at a shear rate of 100/s, of less than 40, alternatively of less than 30, alternatively of less than 20, alternatively of less than 10, alternatively of less than 5, alternatively of less than 3, alternatively of less than 2, alternatively of less than 1.5.

In some embodiments, the coating composition comprises a viscosity recovery of at least 60%, alternatively at least 65%, alternatively at least 70%, alternatively at least 75%, alternatively at least 80%, alternatively at least 85%, alternatively at least 90%, alternatively at least 95% within 30 s following exposure to a shear rate 12,000/s. In these or other embodiments, the coating composition comprises a viscosity recovery of at least 60%, alternatively at least 65%, alternatively at least 70%, alternatively at least 75%, alternatively at least 80%, alternatively at least 85%, alternatively at least 90%, alternatively at least 95% within 15 s following exposure to a shear rate 12,000/s. In these or yet other embodiments, the coating composition comprises a viscosity recovery of at least 60%, alternatively at least 65%, alternatively at least 70%, alternatively at least 75%, alternatively at least 80%, alternatively at least 85%, alternatively at least 90%, alternatively at least 95% within 2 s following exposure to a shear rate 12,000/s.

Viscosity may be determined according to standard methods known in the art. For example, ASTM 7867-13 with cone-and-plate or parallel plates at various sheer rates can be utilized.

The high transfer efficiency applicator itself may be any known in the art. For example, in various embodiments, the applicator is as described in one or more of patent numbers US20150375258A1, US20040217202 A1, US 2009/0304936 A1, U.S. Pat. Nos. 7,824,015 B2, 8,091,987 B2, WO 2018/206309 A1, each of which are expressly incorporated herein in their entirety for use in various non-limiting embodiments. The applicator may be alternatively described as a print head.

In one embodiment, the high transfer efficiency applicator includes a nozzle that defines a nozzle orifice and may have a nozzle diameter of from about 0.00002 m to about 0.0004 m. In another embodiment, the applicator may be fluidly connected to a reservoir configured to contain the coating composition. For example, the high transfer efficiency applicator may be configured to receive the coating composition from the reservoir and configured to expel the coating composition through the nozzle orifice to the substrate to form a coating layer. It is to be appreciated that ranges for the nozzle diameter, viscosity, density, surface tension, and relaxation time may be defined by any of the ranges described herein or any known in the art. In various non-limiting embodiments, all values and ranges of values, both whole and fractional, including and between the aforementioned values, are hereby expressly contemplated for use herein.

The high transfer efficiency applicator may be configured to expel the coating composition through the nozzle orifice at an impact velocity of from about 0.2 m/s to about 20 m/s. Alternatively, the high transfer efficiency applicator may be configured to expel the coating composition through the nozzle orifice at an impact velocity of from about 0.4 m/s to about 10 m/s, or alternatively at a value outside these ranges.

The nozzle orifice may have a nozzle diameter of from about 0.00004 m to about 0.00025 m. The coating composition may be expelled from the high transfer efficiency applicator as a droplet having a particle size of at least 10 microns. Alternatively, the coating composition may be expelled from the high transfer efficiency applicator in a stream.

In various embodiments, the high transfer efficiency applicator includes a plurality of nozzles with each of the nozzles defining a nozzle orifice. The plurality of the nozzles may be arranged in a linear configuration relative to one another along a first axis. For example, in various embodiments, the plurality of the nozzles includes a nozzle A and a nozzle B adjacent the nozzle A. The nozzle A and the nozzle B can be spaced from each other in a nozzle distance. The high transfer efficiency applicator distance from the substrate can be substantially the same as the nozzle distance. Likewise, it is contemplated that one, two, three, or even more applicators may be used in conjunction with each other. Each of the applicators may independently be as described herein or may be any known in the art.

In various embodiments, the high transfer efficiency applicator includes about 50 nozzles aligned along a y-axis. However, it is to be appreciated that an applicator can include any number of nozzles. Each nozzle may be actuated independent of the other nozzles to apply the coating composition to the substrate. During jetting, independent actuation of the nozzles can provide control for placement of each of the droplets of the coating composition on the substrate.

In one embodiment, the plurality of the nozzles are spaced relative to each other to form a rectangular array and wherein the plurality of the nozzles can be configured to alternate expelling of the coating composition between adjacent nozzles of the rectangular array to reduce sag of the coating composition.

Two or more applicators may be coupled together to form a print head assembly. In certain embodiments, the applicators are aligned together such that the y-axis of each of the applicators are parallel to the other y-axes. Further, the nozzles of each of the applicators may be aligned with each other along an x-axis, which is perpendicular to the y-axis, such that an "array" is formed. One nozzle may be equally spaced from the other nozzles directly adjacent the one nozzle, relative to the x-axis and the y-axis. This configuration of nozzles may be suitable for applying the same coating composition by each of the applicators to the substrate as the print head assembly moves along the x-axis. Without being bound by theory, it is believed that equal spacing of the nozzles, relative to both the x-axis and the y-axis, may result in uniform application of the same coating composition on the substrate. Uniform application of the same coating composition may be suitable for single-color applications, two-tone color applications, and the like.

Alternatively, one set of nozzles along a first y-axis may be closely spaced to another set of nozzles relative to the spacing of each of the nozzles along the y-axis of a single high transfer efficiency applicator. This configuration of nozzles may be suitable for applying different coating compositions by each of the high transfer efficiency applicators to the substrate. Different coating compositions utilized within the same high transfer efficiency applicator assembly may be suitable for logos, designs, signage, striped, camouflage appearance, and the like.

The nozzles of the high transfer efficiency applicator may have any configuration known in the art, such as linear, concave relative to the substrate, convex relative to the substrate, circular, and the like. Adjustment of the configuration of the nozzles may be necessary to facilitate cooperation of the high transfer efficiency applicator to substrates having irregular configurations, such as vehicles including mirrors, trim panels, contours, spoilers, and the like.

The high transfer efficiency applicator may be configured to blend individual droplets to form a desired color. The high transfer efficiency applicator may include nozzles to apply cyan coating compositions, magenta coating compositions, yellow coating compositions, and black coating compositions. The properties of coating compositions may be modified to promote blending. Further, agitation sources, such as air movement or sonic generators may be utilized to promote blending of the coating compositions. The agitation sources may be coupled to the high transfer efficiency applicator or separate therefrom.

Identifying suitable properties of the coating composition for use in the high transfer efficiency applicator may be dependent on properties of the high transfer efficiency applicator. Properties of the high transfer efficiency applicator may include, but are not limited to, nozzle diameter of the high transfer efficiency applicator, impact velocity of the coating composition by the high transfer efficiency applicator, speed of the high transfer efficiency applicator, distance of the high transfer efficiency applicator from the substrate, droplet size of the coating composition by the high transfer efficiency applicator, firing rate of the high transfer efficiency applicator, and orientation of the high transfer efficiency applicator relative to the force of gravity.

The method includes the step of providing the coating composition to the high transfer efficiency applicator. The step of providing is not particularly limited and may be any known in the art. For example, the step of providing may be describe as providing one or more components of the composition, in whole or in part, combining these components to form the composition, and then providing the completed composition. Alternatively, the step of providing may be describe as pumping, flowing, moving, or otherwise delivering one or more components of the composition or the composition as a whole to the high transfer efficiency applicator. The step of providing may be described as a continuous process or a batch process. Similarly, the step of providing may include continuous sub-steps and/or batch sub-steps. In various embodiments, the step of providing is described as pumping the composition to the applicator under pressure. The step of providing may be as understood by one of skill in the art.

The coating composition may be utilized to coat any type of substrate known in the art, so long as the conditions of the method may be achieved (i.e., whereby the substrate bears the partially-dehydrated aqueous layer onto which the coating composition may be applied). As such, and as described further below, it will be appreciated that the term "substrate" is used to generally refer to the article to be coated, and not strictly the surface onto which the coating will be applied (i.e., as that surface will bear the partially-dehydrated aqueous layer, as described herein).

In embodiments, the substrate is a vehicle, automobile, or automobile vehicle. A "vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate.

Various substrates may include two or more discrete portions of different materials. For example, vehicles can include metal-containing body portions and plastic-containing trim portions. Due to the bake temperature limitations of plastics (80° C.) relative to metals (140° C.), the metal-containing body portions and the plastic-containing trim portions may be conventionally coated in separate facilities thereby increasing the likelihood for mismatched coated parts. A coating composition suitable for plastic substrates may be applied to the plastic substrates by the high transfer efficiency applicator after application and bake of the coating composition suitable for metal substrates without the need for masking the substrate and wasting a portion of the coating composition through low-transfer efficiency application methods, such as conventional spray atomization. The coating composition suitable for plastic substrates may be applied using a first high transfer efficiency applicator and the coating composition suitable for metal substrates may be applied using a second high transfer efficiency applicator. The first high transfer efficiency applicator and the second high transfer efficiency applicator may form a high transfer efficiency applicator assembly.

Alternatively, the high transfer efficiency applicator may be used in-line with conventional coating techniques. For example, in certain embodiments, one or more coatings are applied to the substrate via a conventional coating method (e.g. spraying), and then the coating composition is next applied via the high transfer efficiency applicator. In this fashion, the coating prepared with the coating composition may be defined as an overspray free coating, as compared to the conventional application methods used for the other one or more coatings applied to the substrate. This process is described in furth detail below.

The method also includes the step of applying the coating composition to the substrate through the high transfer efficiency applicator to form the coating layer on the substrate. The step of applying is not particularly limited. In various embodiments, the step of applying is further defined as jetting, e.g. jetting through the high transfer efficiency applicator. Alternatively, the step of applying may be further defined as printing. In certain embodiments, the step of applying may be defined as digital printing.

Typically, the step of applying is further defined as jetting or printing through, with, or by, the high transfer efficiency applicator. During the step of applying, a loss of volatiles after application through the high transfer efficiency applicator is less than about 0.5 weight percent actives based on a total weight of the coating composition. In various embodiments, this amount is less than about 0.4, 0.3, 0.2, or 0.1, weight percent actives based on a total weight of the coating composition. Typically, the terminology "volatiles" is defined as substances which will evaporate thereby resulting in a weight loss of the coating composition. Loss of volatiles after application would be determined by the increase in % solids after over before application where % solids in each case would be determined by gravimetrically by ASTM D2369-10, In various non-limiting embodiments, all values and ranges of values, both whole and fractional, including and between the aforementioned values, are hereby expressly contemplated for use herein.

In certain embodiments, the step of applying produces droplets or a stream of the coating composition that impact(s) the substrate. In various embodiments, at least about 99.5, 99.6, 99.7, 99.8, 99.9, or even higher, % of the coating composition expelled from the high transfer efficiency applicator contact the substrate. Without being bound by theory, it is believed that an increase in the number of droplets contacting the substrate relative to the number of droplets that do not contact the substrate thereby entering the environment, improves efficiency of application of the coating composition, reduces waste generation, and reduces maintenance.

In various embodiments, at least about 99.5, 99.6, 99.7, 99.8, 99.9, or even higher, % of the droplets of the coating composition expelled from the high transfer efficiency applicator are monodispersed such that the droplets have a particle size distribution of less than about 20%, alternatively less than about 15%, alternatively less than about 10%, alternatively less than about 5%, alternatively less than 3%, alternatively less than 2%, alternatively less than 1%, or alternatively less than about 0.1%. While conventional applicators rely on atomization to form "a mist" of atomized droplets of a coating composition having a dispersed particle size distribution, the monodispersed droplets and/or streams formed by the high transfer efficiency applicator can be directed to the substrate thereby resulting in an improved transfer efficiency relative to conventional applicators. In various non-limiting embodiments, all values and ranges of values, both whole and fractional, including and between the aforementioned values, are hereby expressly contemplated for use herein.

In typical embodiments, the coating composition is ejected from one or more nozzles of the high transfer efficiency applicator in an engineered/controlled fashion that creates a fine stream, that may or may not breakup into droplets. This stream is targeted to the substrate such that drops arrive at specific locations to potentially form a continuous film or pattern on the subject. As a result, in many embodiments, there is essentially no overspray (drops missing their target) and nearly 100% transfer efficiency (all paint goes to targeted location on the substrate.) As will be appreciated by one of skill in the art, some allowance is made for start-up and stopping the high transfer efficiency applicator. Devices of this type can be described as drop-on-demand, stream-on demand, overspray-free, or ultra-high transfer efficiency applicators. These devices are different from spray atomization devices and techniques wherein energy, such as pneumatic, hydraulic, or centrifugal, energy, is introduced to create a partially controlled, random distribution of droplet sizes, trajectories and speeds, and wherein some additional mechanism, e.g. electrostatics and or shaping air, then guides a paint droplet cloud to a substrate. Relative to traditional paint spray, there is always some overspray and transfer efficiency loss.

While known coating appearance attributes including gloss, distinctness of image and orange peel can be quantified by various instruments, this is not the case for nozzle line and stripe overlap visibility. Coatings applied with a high transfer efficiency applicator may have high gloss, high distinctness of image, no orange peel, but still have visible nozzle line and stripe overlap defects.

Figure 1B:
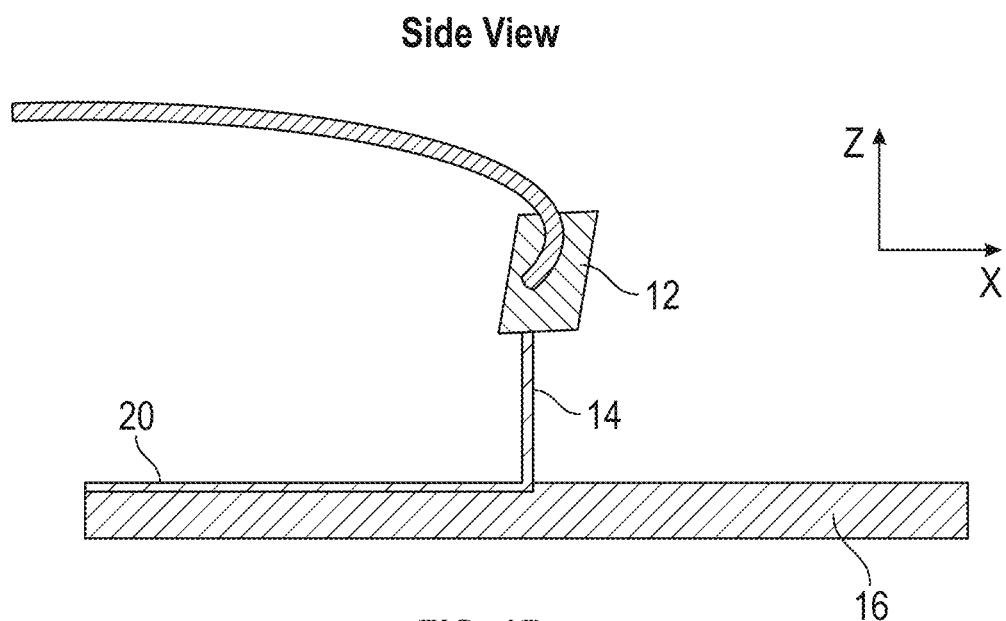
FIG. 1B is a side view of FIG. 1A.

In some embodiments, applying the coating composition to the substrate comprises disposing at least partially-overlapping successive stripes of the coating composition onto the substrate to form a continuous wet film. For example, in one such embodiment, e.g. as shown in FIGS. 1A and 1B, a high transfer efficiency applicator 12 jets a stream of the composition 14 onto the substrate 16. In FIG. 1A, a space 18 is shown between stripes 20 of the composition 14 disposed on the substrate 16. This space 18 is preferably minimized or eliminated. However, those of skill in the art appreciate that overlapping the stripes 20 with conventional coating compositions can unintentionally lead to overlap defects via undesirable buildup of the composition and the formation of a type of "hill" or raised section of the substrate, as well as "valley" or low section of the substrate . . . . This is also preferably minimized in the present embodiments, owing to the rheological profile of the coating composition allowing for reduced overlap defects.

Figure 3A:
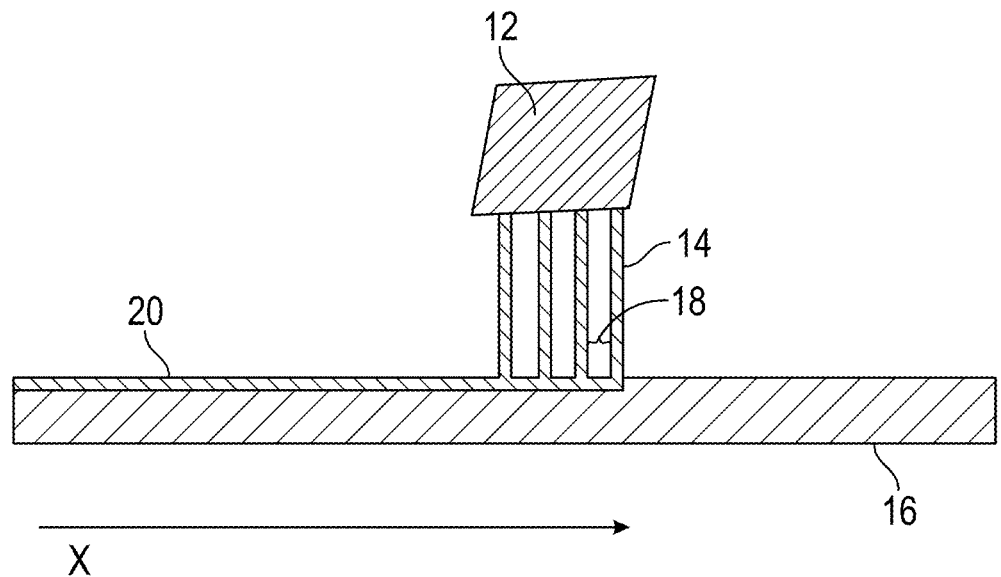
FIG. 3A is a side view of a high transfer efficiency applicator including a plurality of nozzles applying a coating composition to a substrate wherein single nozzle lines can be defined as having a periodically repeating pattern that has spacing consistent with the spacing between nozzles on the nozzle plate.
Figure 3B:
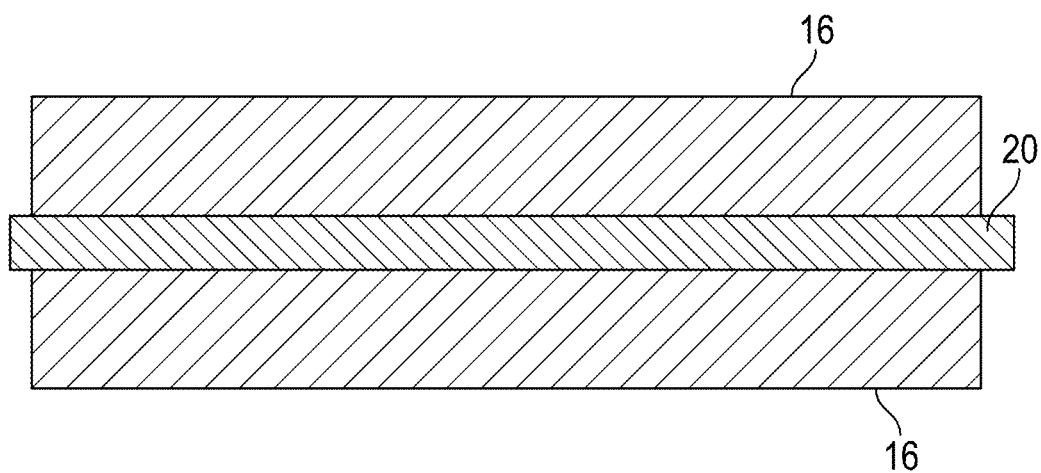
FIG. 3B is a side view of FIG. 3A showing stripes of the coating composition applied to a substrate wherein each stripe is a single pass of about 50 nozzles.
Figure 3C:
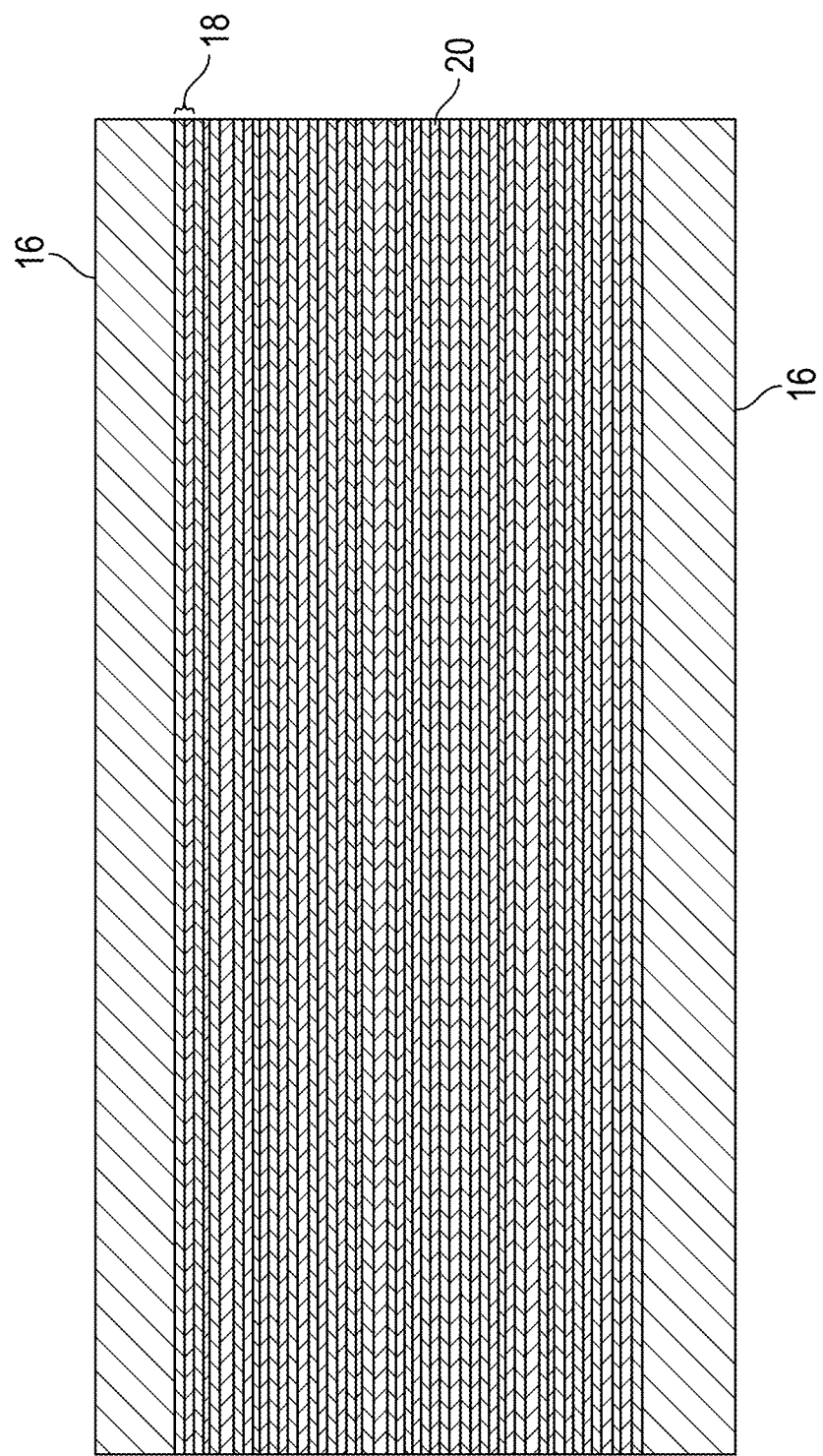
FIG. 3C is a magnified view of a single pass of FIG. 3A wherein a defect is present where each nozzle impacted the substrate.

In FIGS. 3A-3C, single nozzle lines are shown and can be defined as having a periodically repeating pattern that has spacing 18 consistent with the spacing 18 between nozzles of the high transfer efficiency applicator. In FIG. 3B, each stripe is a single pass of ~50 nozzles. FIG. 3C shows as magnified view of FIG. 3A relative to a single pass of a high transfer efficiency applicator. A defect is present wherein each nozzle jet of the composition impacted a substrate 16. This type of defect can be straight or squiggly, may be continuous or have breaks, and may appear smooth or be raised.

Typically, nozzle lines give a striated appearance in the coating as applied, with a distance between visible lines having the same spacing 18 as the nozzles on the applicator 12. The stripe overlap defect is also parallel to the direction of application (e.g. X), however, the defect is not associated with applicator nozzle spacing and is only present where application of adjacent stripes applied sequentially next to each other overlap and are visible over a length scale of 5-10 mm, i.e., perpendicular to the application direction. While this is typically assessed by comparison with a printed control coating of low viscosity and no rheology control agent, the surface profile measurements introduced below may be used to demonstrate a defect is visible when the difference in height of high regions vs low regions is greater than 1-2 microns.

For example, while not shown, it will be appreciated that an Optimap™ PSD using phase-stepped deflectometry may be utilized to determine the surface profile of a coating, e.g. of one or more areas approximately 79×57 mm. Such coating surface profiles can be shown to include the region of stripe overlap, with a color scale corresponding to coating height differences (e.g. green representing an average coating surface height, red representing a "hill" having a greater height than average (e.g. up to 3 microns), and blue representing a "valley" (e.g. down to 3 microns) less than the surface average). The stripe overlap region may thus be observed as a defect parallel to the direction of application and will become more visible as the hills and valleys become more pronounced.

As shown schematically (top down) in FIG. 3C, stripes 20 each represent a line of coating composition deposited from a single nozzle parallel to the direction of application. Application lines with spacing 18 resulting from application of the stripes 20 may be visible immediately after application, but are preferably less visible over time as flow and leveling occur. However, if sufficient flow and leveling does not occur, after coating cure the lines may still be visible and thereby give non-uniform and generally undesirable coating appearance. In specific embodiments, the overspray free coating layer is substantially free from visible application lines.

Figure 4:
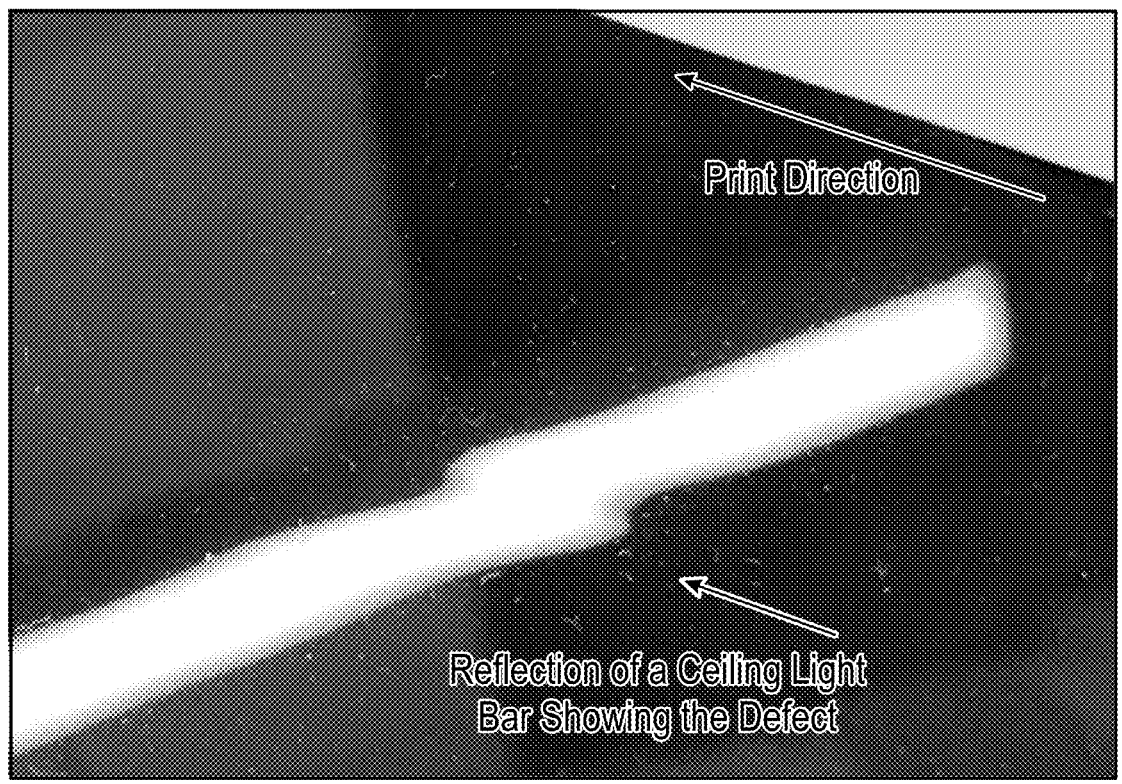
FIG. 4 is a photograph of a substrate with a comparative composition disposed thereon showing stripe overlap defect.

For illustration, FIG. 4 is a photograph of a substrate with a comparative composition disposed thereon showing visible stripe overlap defect.

In some embodiments, the step of applying is further defined as applying the coating composition through the nozzles in a plurality of lines on the substrate in a direction (X) along the substrate wherein each line partially overlaps with an adjacent line to form an overlap region and a non-overlap region, wherein the overlap region is visually smooth such that there is less than an about 1 micron variation in thickness of the overlap region as compared to the thickness of the non-overlap region measured after the step of curing over a 5 mm distance measured perpendicularly to the direction (X). In some such embodiments, the overspray free coating layer is prepared substantially free from visible stripe overlap defects.

In typical embodiments, the coating composition is applied to a wet film thickness of at least about 6, alternatively at least about 8, alternatively at least about 10, alternatively at least about 12 or more microns. In other embodiments, a larger wet film thickness (e.g. 25, 30, or more microns) may be utilized. In some embodiments, the wet film thickness can measured at about 45 degrees without visible sag. Higher or lower values may also be achieved. In exemplary embodiments, no visible sag is apparent upon application of the coating composition.

In specific embodiments, the method is utilized to prepare a multilayer coating on the substrate.

Multilayer coatings are used in various applications, and are composed of various layers such as primer/surfacer layers, basecoat layers, barrier coating layers, filler layers, topcoat layers, clear coat layers, etc. For example, a configuration with a primer layer, a filler layer and a topcoat layer, wherein the topcoat layer comprises a basecoat and a clear coat or is a pigmented one-coat topcoat layer, is typical for a vehicle coating and vehicle repair coating structure. The different layers of a multilayer coatings are applied successively. Between each application step, a certain conditioning/drying time is typically required until the next layer can be applied. The actual minimum drying time required before a previously applied coating can be overcoated depends on various factors such as physical drying and reactivity of the applied coating composition, the amount and type of solvent contained in the coating composition, the presence of curing catalysts, and external factors such as drying temperature and moisture during drying. In any case, prior to applying another coating layer to a previously applied coating layer, it is necessary that, on the one hand, the previously applied coating layer is sufficiently dried so that it does not mix or react with the other coating layer and its mechanical resistance is sufficient. On the other hand, especially for surfacer layers, it is also desirable that after drying, the mechanical resistance be such that it is still possible to remove defects in the dried layer before any further layer, such as a basecoat or a basecoat pigmented one-coat topcoat, is applied. Defects of the surfacer layer may also be visible after the application of another layer and thus degrade the visual appearance of the final coating. In other words, all of the above requirements affect the overall quality, and especially the visual appearance, of each topcoat layer that is applied to the previously applied filler layer.

A wet-on-wet application method as described herein is specified in that after applying a first layer, e.g. the filler layer, and then conditioning (e.g. evaporating) the surfacer layer, the surfacer layer is not ground and in particular not completely ground, for example, with the aim of leveling the surface of the surfacer layer by removing any undesired structure therefrom. In other words, a wet-on-wet application process is not a grinding process. In addition, both the duration and conditions of evaporating the filler prior to application of a topcoat layer, such as temperature, air circulation or moisture, should not be limited by the term wet-on-wet application method.

Typically, the substrate comprises an at least partially dehydrated aqueous basecoat layer (e.g. from a waterborne basecoat), and the step of applying the coating composition to the substrate comprises disposing the coating composition onto the partially dehydrated aqueous basecoat layer, such that the application of the coating composition thereto is a wet-on-wet process. In some such embodiments, the method further includes the step of preparing the at least partially dehydrated waterborne basecoat layer on the substrate.

For example, in some embodiments the method comprises, before application of the coating composition:
  disposing a film of a waterborne primer on the substrate;
  conditioning the film of waterborne primer to give a partially dehydrated primer layer;
  disposing a film of a waterborne basecoat on the partially dehydrated primer layer; and
  conditioning the film of the waterborne basecoat to form the partially dehydrated waterborne basecoat layer.

It will be readily understood that the parameters for disposing the films on the substrate, e.g. in an in-line wet-on-wet process are not limited, such that many techniques and various parameters may be selected (e.g. depending on the substrate material, the coatings being utilized, etc.). Particular such parameters will be understood in view of the examples below.

Likewise, in some embodiments, a clear coat is applied over the overspray free coating layer to prepare the coated article. As such, in particular embodiments, the method comprises an in-line wet-on-wet process to prepare the coated article, comprising the steps of:

preparing a partially dehydrated primer layer on the substrate;

preparing a partially dehydrated basecoat layer on the primer layer;

preparing a partially dehydrated overspray free coating layer on the basecoat layer with the coating composition; and preparing a clear coat layer on the overspray free coating layer.

In this in-line wet-on-wet process, the primer, basecoat, and coating composition are all waterborne coating compositions. In typical embodiments, the clear coat is a solventborne composition, e.g. a 2 k solventborne clear coat.

Subsequent to the final coating application, the multilayer coating is typically subjected to finishing conditions, e.g. to fully cure the various coatings.

Figure 5:
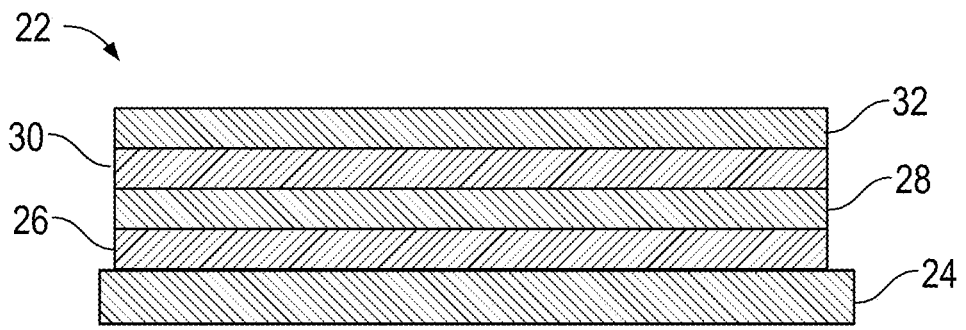
FIG. 5 is a schematic cross-sectional view of a coated article according to embodiments of the disclosure.

With reference to FIG. 5, a schematic cross-section of an article prepared with the multilayer coating described above is shown generally at 22. The coated article 22 comprises a component layer 24, primer or surfacer layer 26, a basecoat layer 28, an overspray free coating layer 30 according to the embodiments herein, and a clear coat layer 32.

The component layer 24 will be understood to represent the component to be coated, e.g. a panel of a vehicle, etc. As such, the component layer 24 generally represents the substrate to be coated at the beginning of the coating methods herein. Upon application of a primer (e.g. a coating that will subsequently give the primer or surfacer layer 26) to the component layer 24, the term "substrate" may refer to the primer-coated component (i.e., the combination of layers 24, 26, prior to final curing) with respect to next overcoating step (e.g. applying the basecoat, which will subsequently give the basecoat layer 28). Likewise, once the component is coated with both the primer and basecoat, the primed and basecoated component (i.e., the combination of layers 24, 26, 28, prior to final curing) may be referred to as the "substrate" with respect to the next overcoating step (e.g. applying the coating composition).

Figure 2A:
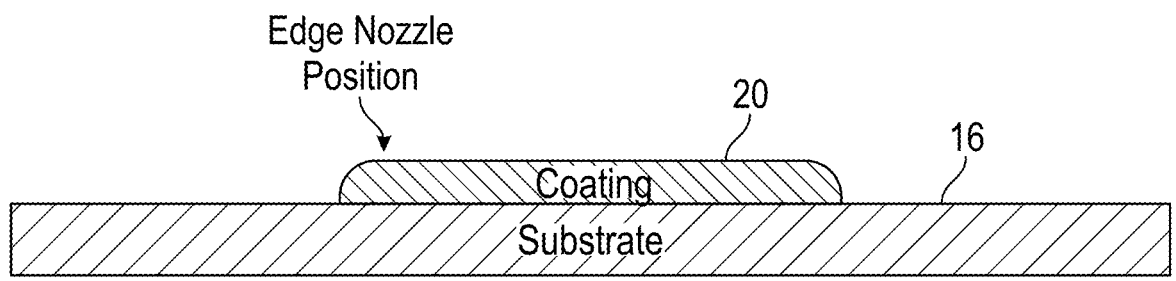
FIG. 2A is a side view of a substrate with a paint (coating composition) disposed thereon showing a position of an edge nozzle of a high transfer efficiency applicator.
Figure 2B:
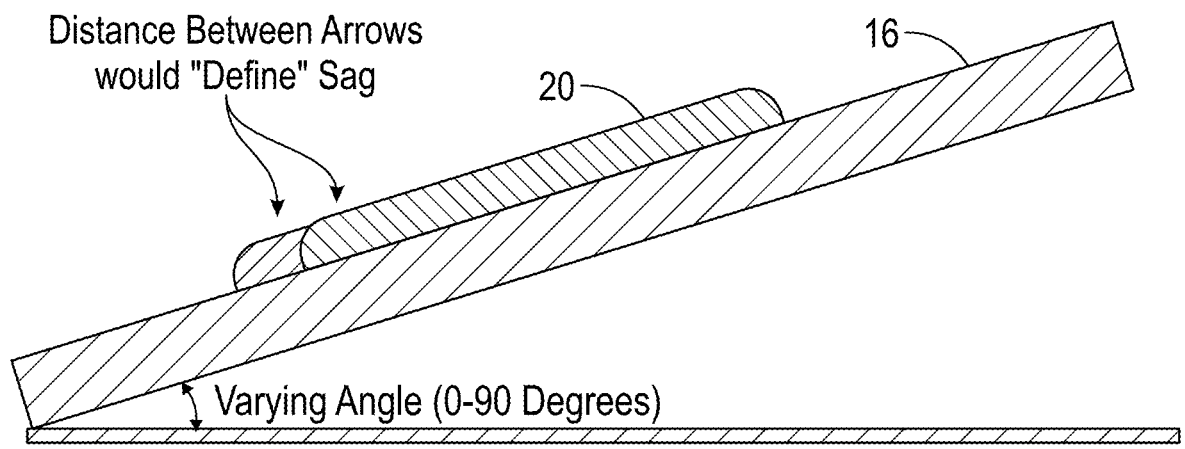
FIG. 2B is a side view of the substrate of FIG. 2A that is tilted during a process of determining sag wherein an angle of the substrate as compared to a horizontal surface is indicated.

In some embodiments, both of layers 26 and 28 are prepared from aqueous/waterborne coatings. In specific embodiments, one, alternatively two, alternatively each of the layers 28, 30, and 32 is prepared via wet-on-wet application to the respective undercoating. In particular such embodiments, the primer used to prepare the primer layer 26 is, after application, at least partially dehydrated before overcoating application of the basecoat. In typical embodiments, preparing the coated article 22 comprises subjecting the fully-coated component to curing conditions, i.e., to cure the clear coat and give the final clear coat layer 32, while at the same time fully curing the undercoatings to give the final layers 26, 28, and 30 as well Sag Evaluation:

To evaluate sag, the following procedure is typically employed:

A substrate panel is oriented horizontally prior to coating application;

A high transfer efficiency applicator is used to apply 4 successive stripes of the coating composition to the horizontal substrate panel such that the composition will overlap to provide a continuous coated surface with a target wet film thickness (typically 30 microns or greater) and a coated substrate width of about 180 mm;

After application of the composition, the panel is tilted so that the approximately 180 mm coated substrate width is at an angle of about 45 degrees from horizontal, e.g. as shown in FIG. 2B;

After about 5 minutes at room temperature, with the panel angle maintained the same, the panel is dehydrated at 82° C. for 5 min, followed by clearcoat spray and final bake to full cure;

Sag, if present, is evidenced by drips at the bottom edge of the coating, and is evaluated visually;

While not shown herein, if present, nozzle line visibility can be observed as a fine lines parallel to each other as well as the application direction and having a spacing the same as the adjacent nozzles in the applicator (~1 mm);

If present, stripe overlap visibility will be assessed visually in the region where coating is applied in sequential application passes. It is found that as little as 1 micron thickness variation over a 5 mm distance parallel to the direction of application will result in stripe overlap visibility, e.g. as shown in FIG. 4.

The use of the coating composition may reduce or eliminate nozzle clogging. For example, high transfer efficiency "stream on demand" or "drop on demand" applicators generally include an array of fine diameter nozzles that each has a nozzle diameter of about 20 microns to 200 microns. It is typically expected for reliable fluid jetting that the particle size of any ingredient of the coating composition must be no bigger than about 10% of the nozzle diameter. While some ingredients of the coating composition may have an average size that meets this criteria, if there is a small content of oversized particles, over time, nozzle clogging will occur. The consequence is either a partially clogged nozzle which may result in misdirected drops or streams, or a completely clogged nozzle which will prevent fluid ejection. In either case, this will result in a coating defect. Clogging can be evaluated in two manners: (1) plugging of a filter installed prior to the applicator and (2) missing lines during coating application followed by microscope verification of debris in nozzle.

EXAMPLES

The following examples, illustrating embodiments of this disclosure, are intended to illustrate and not to limit the invention.

All parts and percentages are reported on a weight basis unless otherwise indicated. If provided, molecular weights (both number and weight average molecular weight) referred to herein may be determined by conventional methods known in the art. For example, molecular weights for polyaspartate resins can be determined via gel permeation chromatography (GPC), e.g. using polystyrene standards and a tetrahydrofuran (THF) eluent. Unless otherwise indicated, molecular weights are reports as weight average molecular weight (Mw).

Materials

Unless otherwise noted, all solvents, substrates, and reagents are purchased or otherwise obtained from various commercial suppliers (e.g. BASF, Covestro, Evonik, Sigma-Aldrich, VWR, Alfa Aesar, etc.) and utilized as received (i.e., without further purification) or as in a form used conventionally in the art.

Examples 1-7 and Comparative Examples (CE) 1-2

Coating Formulation: Overspray-free coating compositions were prepared using the materials and parameters set forth in Table 1 below. After formulation, the overspray-free coating compositions were evaluated as set forth further below.

A single coating composition was prepared and partitioned into two samples, and used for examples 2 and 3.

Amine is amino methyl propanol.
Cosolvent 1 is isotridecanol.
Cosolvent 2 is ethylene glycol monobutyl ether.
Cosolvent 3 is N-butanol.
Cosolvent 4 is N-methyl-2-pyrrolidone.
Cosolvent 5: is mineral spirit.

Viscosity Analysis: The nine formulated coating compositions of Examples 1-7 and Comparative Examples 1-2

TABLE 1

Formulations of Examples 1-7 and Comparative Examples 1-2

| Example: | 1 | 2 | CE1 | CE2 | 3 | 4 | 5 | 6 | 7 |
|---|---|---|---|---|---|---|---|---|---|
| Thickener (C1): | 4.58 | 4.50 | 0.00 | 0.00 | 4.50 | 11.43 | 10.58 | 7.45 | 5.50 |
| Thickener (C2): | 0.00 | 3.00 | 0.00 | 3.00 | 3.00 | 2.86 | 2.89 | 2.99 | 3.0 |
| Thickener (C3): | 0.00 | 0.00 | 2.16 | 2.16 | 0.00 | 0.00 | 0.00 | 0.00 | 0.00 |
| Crosslinker (B): | 2.35 | 2.35 | 2.35 | 2.35 | 2.35 | 2.24 | 2.26 | 2.34 | 2.35 |
| Binder (A1): | 3.81 | 3.81 | 3.81 | 3.81 | 3.81 | 3.63 | 3.66 | 3.79 | 3.81 |
| Binder (A2): | 1.16 | 1.16 | 1.16 | 1.16 | 1.16 | 1.11 | 1.12 | 1.16 | 1.16 |
| Binder (A3): | 8.15 | 8.15 | 8.15 | 8.15 | 8.15 | 7.76 | 7.84 | 8.11 | 8.15 |
| Polyalcohol: | 2.00 | 2.00 | 2.00 | 2.00 | 2.00 | 1.91 | 1.92 | 1.99 | 2.00 |
| Polyol: | 0.14 | 0.14 | 0.14 | 0.14 | 0.14 | 0.14 | 0.14 | 0.14 | 0.14 |
| Pigment: | 7.55 | 7.55 | 7.55 | 7.55 | 7.55 | 7.19 | 7.26 | 7.51 | 7.55 |
| Catalyst: | 0.14 | 0.14 | 0.14 | 0.14 | 0.14 | 0.13 | 0.13 | 0.13 | 0.14 |
| UV absorber: | 0.03 | 0.03 | 0.03 | 0.03 | 0.03 | 0.02 | 0.02 | 0.03 | 0.03 |
| Leveling additive: | 2.00 | 2.00 | 2.00 | 2.00 | 2.00 | 1.91 | 1.92 | 1.99 | 2.0 |
| Wetting additive: | 1.20 | 1.20 | 1.20 | 1.20 | 1.20 | 1.14 | 1.15 | 1.19 | 1.20 |
| Amine: | 0.01 | 0.01 | 0.32 | 0.30 | 0.01 | 0.01 | 0.01 | 0.01 | 0.01 |
| Cosolvent 1: | 5.00 | 5.00 | 5.00 | 5.00 | 5.00 | 0.00 | 0.00 | 0.00 | 0.00 |
| Cosolvent 2: | 0.0 | 0.0 | 0.0 | 0.0 | 0.0 | 4.76 | 0.0 | 0.0 | 0.0 |
| Cosolvent 3: | 0.0 | 0.0 | 0.0 | 0.0 | 0.0 | 0.0 | 4.81 | 0.0 | 0.0 |
| Cosolvent 4: | 0.0 | 0.0 | 0.0 | 0.0 | 0.0 | 0.0 | 0.0 | 4.98 | 0.0 |
| Cosolvent 5: | 0.0 | 0.0 | 0.0 | 0.0 | 0.0 | 0.0 | 0.0 | 0.0 | 5.0 |
| Water: | 61.88 | 58.96 | 64.01 | 61.03 | 58.96 | 53.77 | 54.29 | 56.18 | 579.96 |
| Total: | 100.0 | 100.0 | 100.0 | 100.0 | 100.0 | 100.0 | 100.0 | 100.0 | 100.0 |

Thickener (C1) is a an APEO-free, solvent-free, hydrophobically-modified ethylene oxide urethane (HEUR) rheology modifier.

Thickener (C2) is a layered silicate rheology control agent, provided in a solution of water and polypropylene glycol.

Thickener (C3) is an acrylic alkali swellable emulsion (ASE).

Crosslinker (B) is a highly-methylated, methoxymethyl-functional monomeric melamine crosslinker.

Binder (A1) is a polyurethane dispersion resin formed from a linear polyester diol resin (reaction product of monomers 1,6-hexanediol, adipic acid, and isophthalic acid) and isophorone diisocyanate. About 35 wt % solid.

Binder (A2) is a glycol ether polyester, 80 wt % solid, acid number~7.

Binder (A3) is a styrene-acrylic latex dispersion is formed by a two-step emulsion polymerization process, 46 wt % solid, Tg~-7 C, acid number~12, hydroxyl number~7.

Polyol is a polypropylene glycol 425.

Pigment is a dispersion of amorphous carbon black pigment is similar to a carbon black pigment commercially available from Birla Carbon under the trade name Raven 5000 Ultra II.

Catalyst is a dodecyl benzene sulfonic acid (DDBSA)/amino methyl propanol (AMP) solution.

UV absorber is a commercially available UV absorber.

Leveling additive is a commercially available leveling additive.

Wetting additive is a commercially available silicone-free wetting additive.

were evaluated via controlled shear rate flow sweep and time sweep experiments to assess to demonstrable shear thinning behavior.

ASTM D2196 may be used to determine viscosities.

The results of the evaluation are set forth in Table 2 below.

TABLE 2

Viscosity Evaluation of Examples 1-7 and Comparative Examples 1-2

| Example: | 1 | 2 | CE1 | CE2 | 3 | 4 | 5 | 6 | 7 |
|---|---|---|---|---|---|---|---|---|---|
| Viscosity @ 10k s^-1: | 43 | 40 | 21 | 22 | 40 | 41 | 41 | 38 | 36 |
| Viscosity @ 1k s^-1: | 89 | 98 | 43 | 52 | 98 | 57 | 57 | 61 | 67 |
| Viscosity @ 100 s^-1: | 98 | 127 | 103 | 136 | 127 | 65 | 70 | 70 | 79 |
| Viscosity @ 10 s^-1: | 102 | 138 | 304 | 475 | 138 | 75 | 81 | 79 | 91 |
| Viscosity @ 1 s^-1: | 117 | 164 | 983 | 2020 | 164 | 85 | 92 | 88 | 100 |
| Viscosity @ 0.1 s^-1: | 142 | 182 | 4230 | 9999 | N/A | N/A | N/A | N/A | N/A |
| Viscosity ratio 0.1 s^-1/ 100 s^-1: | 1.4 | 1.4 | 41.1 | 73.5 | N/A | N/A | N/A | N/A | N/A |

TABLE 2-continued

Viscosity Evaluation of Examples 1-7 and Comparative Examples 1-2

| Example: | 1 | 2 | CE1 | CE2 | 3 | 4 | 5 | 6 | 7 |
|---|---|---|---|---|---|---|---|---|---|
| Viscosity ratio 0.1 s^-1/ 10 s^-1: | 1.4 | 1.3 | 13.9 | 21.1 | N/A | N/A | N/A | N/A | N/A |
| Recovery 2 s after 12k s^-1: | 114 | 156 | 911 | 1156 | 156 | 53 | 62 | 58 | 65 |
| Recovery 30 s after 12k s^-1: | 112 | 163 | 996 | 1523 | 163 | 58 | 66 | 65 | 68 |

Figure 6A:
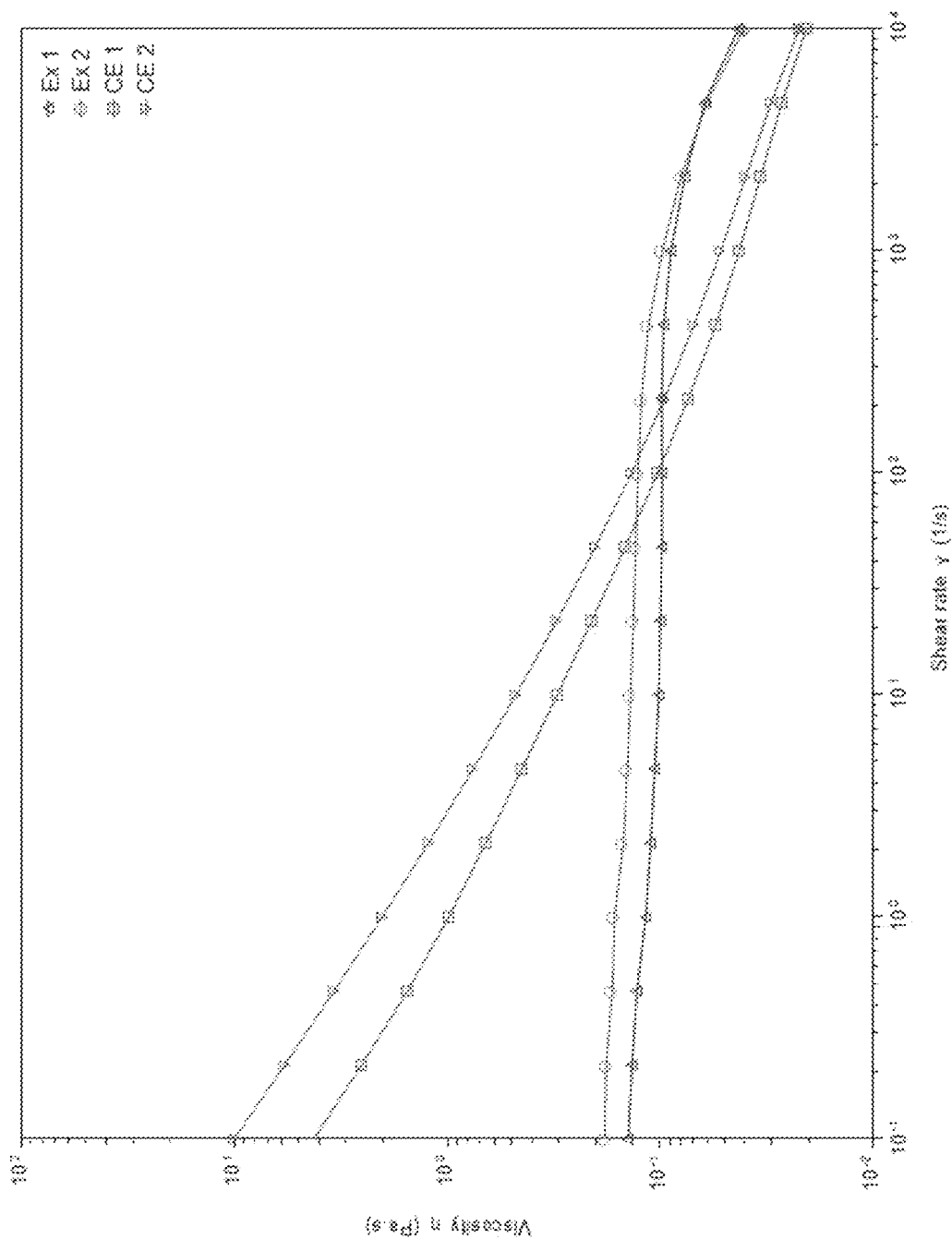
FIG. 6A is a plot showing the results of a controlled shear rate flow sweep, illustrating the rheology profile of exemplary and comparative coating compositions.
Figure 7A:
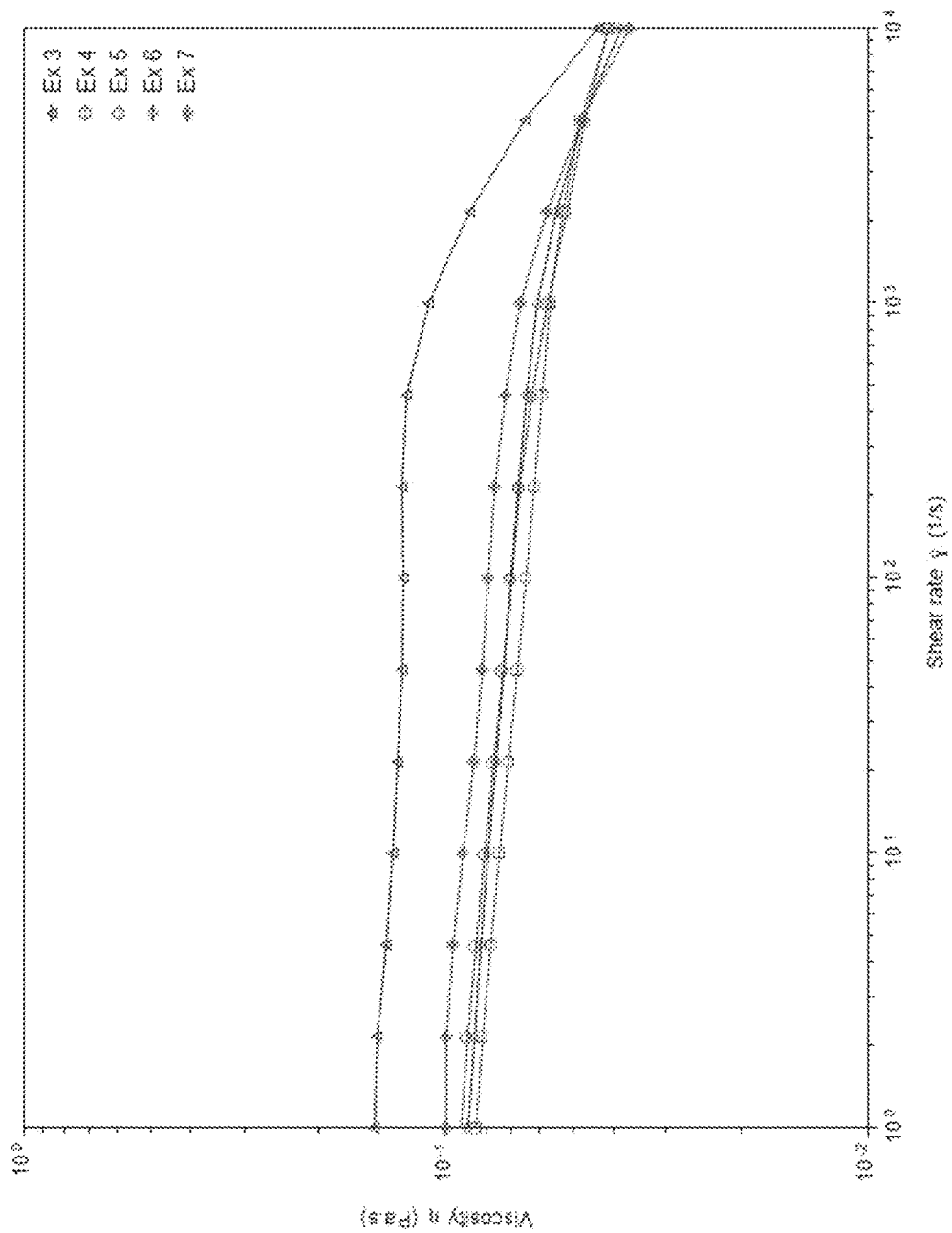
FIG. 7A is a plot showing the results of a controlled shear rate flow sweep, illustrating the rheology profile of exemplary coating compositions.

Regarding the controlled shear rate flow sweep experiments, the results for Examples 1-2 and Comparative Examples 1-2 are plotted and shown in FIG. 6A, and the results for Examples 3-7 are plotted and shown in FIG. 7A.

Figure 6B:
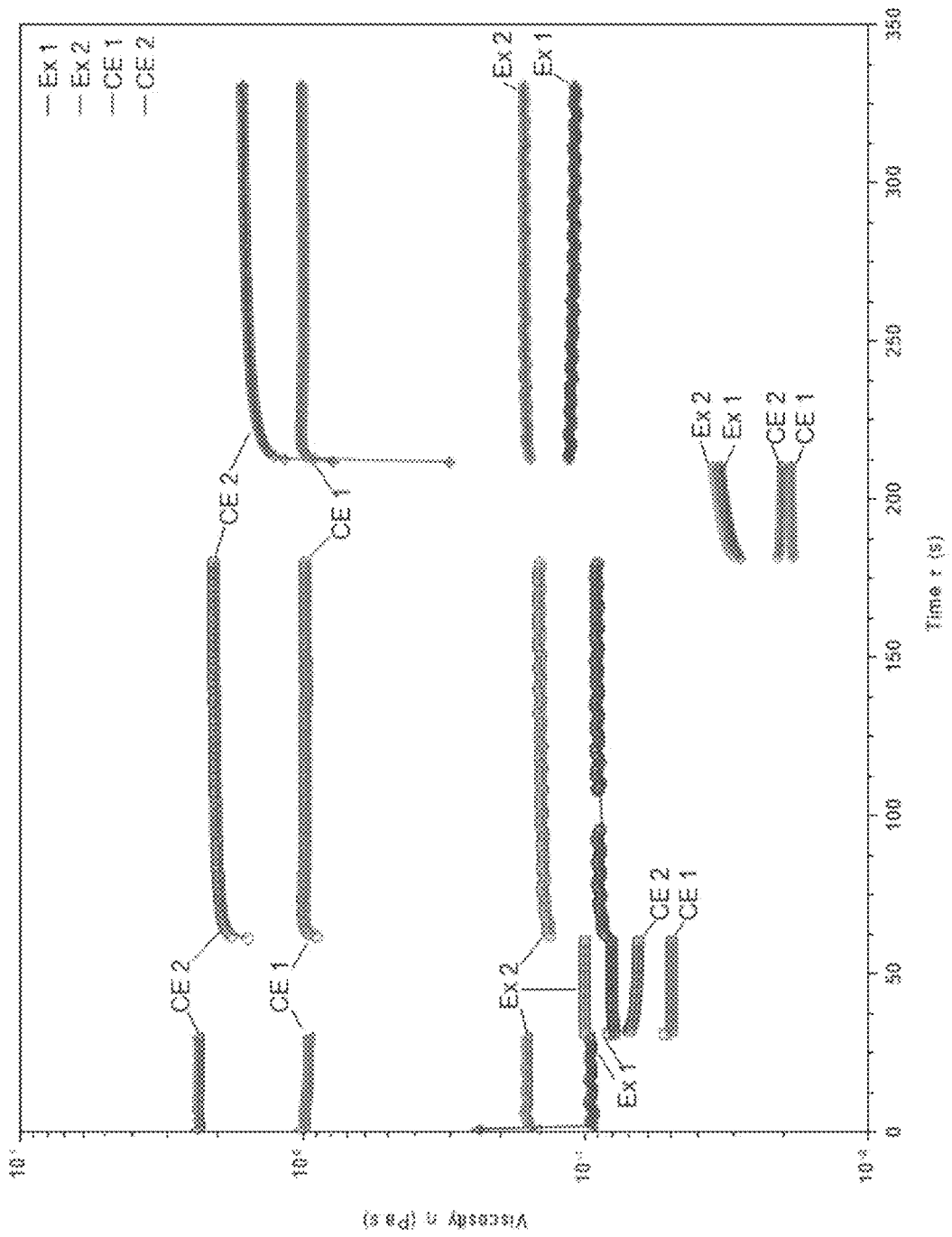
FIG. 6B is a plot showing the results of a time sweep experiment, illustrating the recovery behavior of exemplary and comparative coating compositions.
Figure 7B:
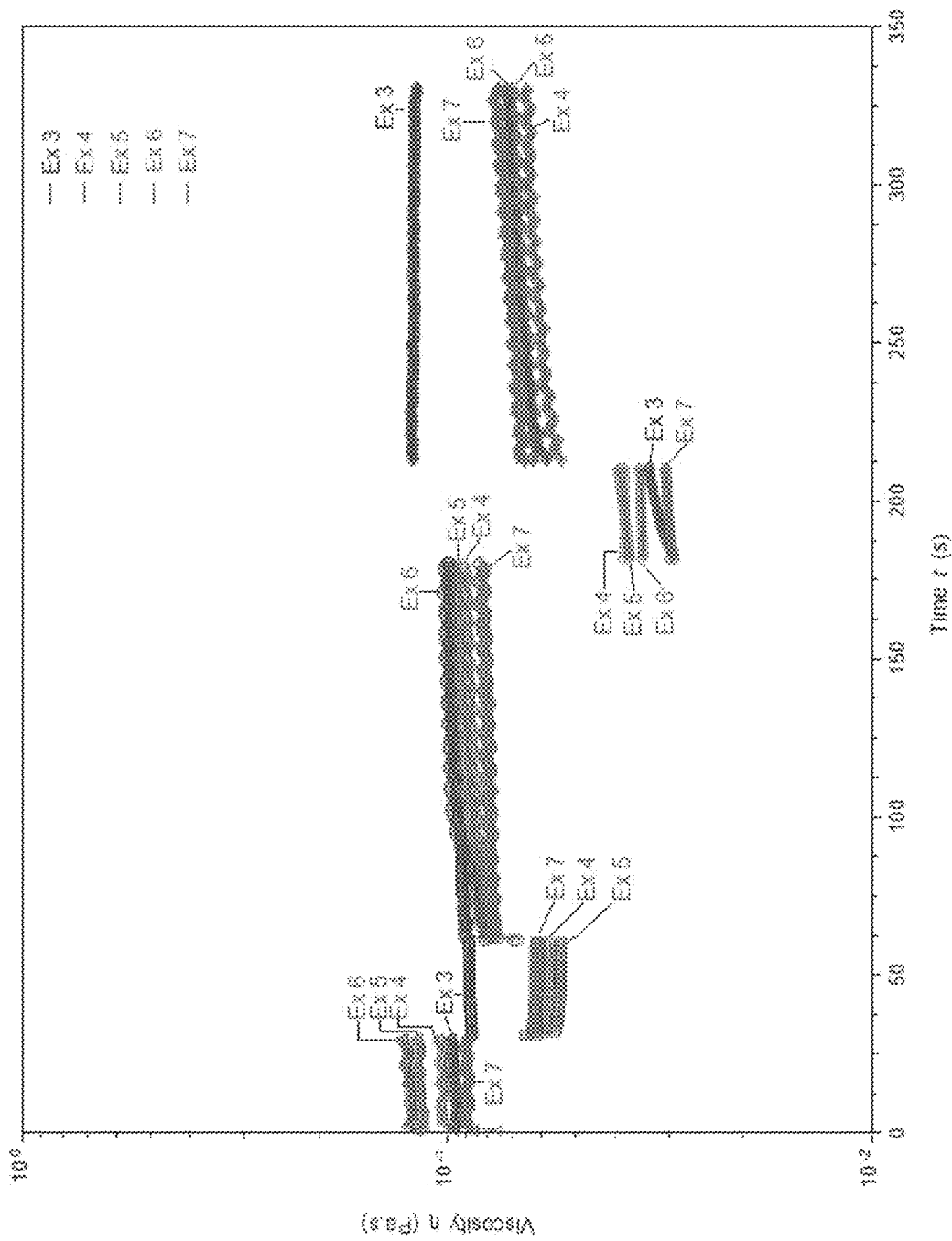
FIG. 7B is a plot showing the results of a time sweep experiment, illustrating the recovery behavior of exemplary coating compositions.

As clearly shown, Examples 1-7 each exhibit near-Newtonian viscosity profiles. Comparative Examples 1-2 exhibit non-Newtonian viscosity profiles Regarding the time sweep experiments, the viscosity recovery performance results for Examples 1-2 and Comparative Examples 1-2 are plotted and shown in FIG. 6B, and the results for Examples 3-7 are plotted and shown in FIG. 7B. The exemplary coating compositions (Examples 1-7) exhibit faster viscosity recovery than comparative coating compositions Comparative Examples 1-2.

Multilayer Coating Preparation: The nine formulated coating compositions of Examples 1-7 and Comparative Examples 1-2 were used in an in-line wet-on-wet multilayer coating process to prepare 4-layer coatings. The as-applied coating compositions were evaluated for sag, pop, and overlap visibility. The process parameters of the multilayer coating preparations are set forth in Table 3 below. The application parameters and performance results are set forth in Table 4 further below.

TABLE 3

Multilayer Coating Parameters of Examples 1-7 and Comparative Examples 1-2

| Layer | Application Method | DFT (um) | Conditioning, After Layer Applied |
|---|---|---|---|
| Waterborne primer | Bell spray w/e-stat | 20 | 2 min ambient flash, 5 min dehydration at 82° C. |
| Waterborne BC | Bell spray w/e-stat | 25 | 6 min ambient flash, 5 min dehydration at 70° C. |
| Waterborne Overspray free | Durr EcoPaintJet | 12 | 5 min ambient flash, 5 min dehydration at 82° C. |
| 2K Clear coat | Bell spray w/e-stat | 60 | 7 min ambient flash, 10 min at 93° C., 20 min 140° C. |

TABLE 4

Multilayer Coating Application Parameters and Performance Results of Examples 1-7 and Comparative Examples 1-2

| Example: | 1 | 2 | CE1 | CE2 | 3 | 4 | 5 | 6 | 7 |
|---|---|---|---|---|---|---|---|---|---|
| Flow rate (g/min): | 187 | 187 | 198 | 198 | 193 | 201 | 199 | 201 | 196 |
| FB (um): | 14 | 10 | 13 | 15 | 8 | 16 | 16 | 9 | 8 |
| 45 deg sag (corrugated panel): | Y | N | N | N | N | Y | N | Y | N |
| 45 deg sag (cm, nose): | $0^1$ | $0^1$ | $0^2$ | $0^1$ | 2.1 | >10 | 4.9 | >10 | 4.8 |
| Overlap Visibility: | ++ | ++ | + | - | ++ | -- | - | -- | -- |
| Pop: | N | N | N | Y | N | N | N | N | N |
| CF: | 77 | 71 | 74 | 68 | 75 | 67 | 75 | 64 | 61 |

[1]No noses observed; fat edge and pop at bottom.
[2]No noses observed; curtain sag between stripes; no pop.

In Table 4 above, each "+" is a positive indicator indicating subjectively better performance as understood and evaluated by one of skill in the art. Each "-" is a negative indicator indicating subjectively poorer performance as understood and evaluated by one of skill in the art. If more than one "+" or "-" sign is used, this means even better, or poorer, performance, respectively, as understood and evaluated by one of skill in the art.

The data set forth above shows that the exemplary compositions exhibit good performance and can be used prepare overspray free coatings in good order, with some exemplary coatings providing superior performance and appearance over the comparative coating compositions.

Examples 8-13

Coating Formulation: Overspray-free coating compositions were prepared using the materials and parameters set forth in Table 5 below. After formulation, the overspray-free coating compositions were evaluated as set forth further below.

A coating composition prepared using the formulation of Example 2 above was assessed during the evaluations alongside Examples 8-13, and reported as Example 2B.

TABLE 5

Formulations of Examples 8-13

| Example: | 8 | 9 | 10 | 11 | 12 | 13 |
|---|---|---|---|---|---|---|
| Thickener (C1): | 4.50 | 4.43 | 4.50 | 4.50 | 4.00 | 3.54 |
| Thickener (C2): | 5.00 | 5.00 | 5.00 | 5.00 | 7.00 | 5.00 |
| Thickener (C3): | 0.00 | 0.33 | 0.50 | 0.67 | 0.50 | 0.75 |
| Crosslinker (B): | 2.35 | 2.35 | 2.35 | 2.35 | 2.35 | 2.35 |
| Binder (A1): | 3.81 | 3.81 | 3.81 | 3.81 | 3.81 | 3.81 |
| Binder (A2): | 1.16 | 1.16 | 1.16 | 1.16 | 1.16 | 1.16 |
| Binder (A3): | 8.15 | 8.15 | 8.15 | 8.15 | 8.15 | 8.15 |
| Polyalcohol: | 2.00 | 2.00 | 2.00 | 2.00 | 2.00 | 2.00 |
| Polyol: | 0.14 | 0.14 | 0.14 | 0.14 | 0.14 | 0.14 |
| Pigment: | 7.55 | 7.55 | 7.55 | 7.55 | 7.55 | 7.55 |
| Catalyst: | 0.14 | 0.14 | 0.14 | 0.14 | 0.14 | 0.14 |
| UV absorber: | 0.03 | 0.03 | 0.03 | 0.03 | 0.03 | 0.03 |
| Leveling additive: | 2.00 | 2.00 | 2.00 | 2.00 | 2.00 | 2.00 |
| Wetting additive: | 1.20 | 1.20 | 1.20 | 1.20 | 1.20 | 1.20 |
| Amine: | 0.00 | 0.06 | 0.08 | 0.11 | 0.08 | 0.12 |
| Cosolvent 1: | 5.00 | 5.00 | 5.00 | 5.00 | 5.00 | 5.00 |
| Water: | 56.98 | 56.65 | 56.39 | 56.20 | 54.89 | 57.07 |
| Total: | 100.0 | 100.0 | 100.0 | 100.0 | 100.0 | 100.0 |

The formulated coating compositions of Examples 8-13 and 2B were assessed for shear thinning behavior as described above. The formulated coating compositions were then used in an in-line wet-on-wet multilayer coating process to prepare 4-layer coatings in the same fashion as described above. The as-applied coating compositions were evaluated for overlap visibility as set forth above, and a 90-degree sag with performance reported as high (H), medium/mild (M), and low (L), where low (L) sag is most desirable.

The results of the viscosity and coating evaluations are set forth in Table 6 below.

TABLE 6

Performance Results of Examples 2B & 8-13

| Example: | 2B | 8 | 9 | 10 | 11 | 12 | 13 |
|---|---|---|---|---|---|---|---|
| Viscosity @ 10k s^-1: | 38 | 35 | 47 | 60 | — | 44 | 45 |
| Viscosity @ 1k s^-1: | 85 | 90 | 106 | 133 | 153 | 116 | 126 |
| Viscosity @ 100 s^-1: | 108 | 132 | 188 | 242 | 284 | 227 | 229 |
| Viscosity @ 10 s^-1: | 116 | 165 | 275 | 414 | 522 | 498 | 470 |
| Viscosity @ 1 s^-1: | 127 | 222 | 481 | 803 | 1109 | 1271 | 1083 |
| Viscosity @ 0.1 s^-1: | 137 | 345 | 738 | 1479 | 2313 | 3297 | 2600 |
| Viscosity ratio 0.1 s^-1/100 s^-1: | 1.3 | 2.6 | 3.9 | 6.1 | 8.1 | 14.5 | 11.4 |
| Viscosity ratio 0.1 s^-1/10 s^-1: | 1.2 | 2.1 | 2.7 | 3.6 | 4.4 | 6.6 | 5.5 |
| Recovery 2 s after 12k s^-1: | 155 | 158 | 464 | 99 | 1433 | 660 | 936 |
| Recovery 30 s after 12k s^-1: | 163 | 187 | 589 | 1225 | 1786 | 1003 | 1065 |
| FB (um): | 10 | 10 | 10 | 10 | 10 | 10 | 10 |
| 90 deg sag (corrugated panel): | H | H | M | L | L | L | L |
| Overlap Visibility: | ++ | ++ | + | − | −− | −− | −− |

Figure 8A:
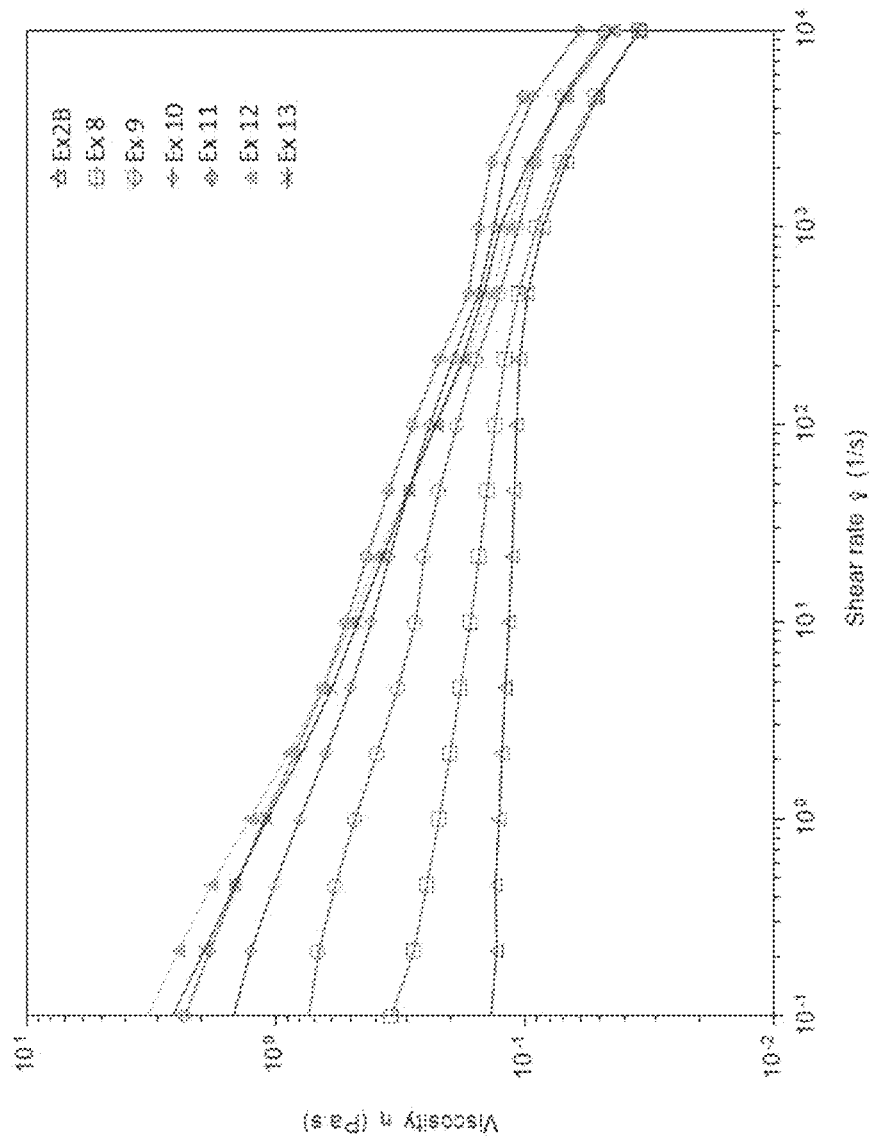
FIG. 8A is a plot showing the results of a controlled shear rate flow sweep, illustrating the rheology profile of additional exemplary coating compositions.
Figure 8B:
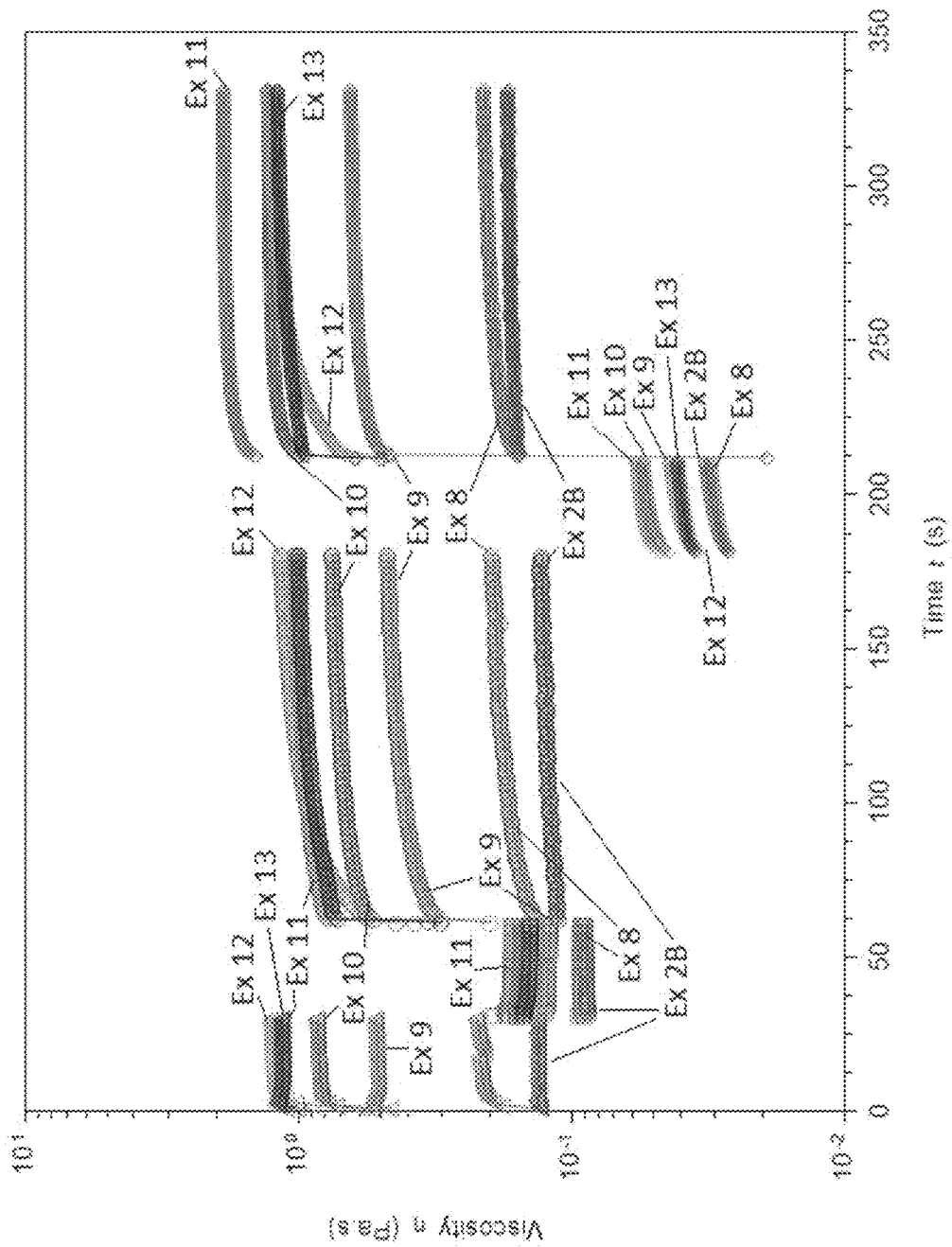
FIG. 8B is a plot showing the results of a time sweep experiment of the exemplary coating compositions of FIG. 8A.

The results of the controlled shear rate flow sweep experiments and time sweep experiments for Examples 2B and 8-13 are plotted and shown in FIGS. 8A and 8B, respectively.

As clearly shown, Examples 8-13 and 2B each exhibit near-Newtonian viscosity profiles and fast viscosity recovery times. Moreover, the coating compositions may be optimized for high recovery and low sag, allowing for improved application and reduced defects in the coatings formed therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It is to be understood that various changes may be made in the function and arrangement of elements described in an exemplary embodiments above, without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the ranges and subranges enumerated herein sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. An individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims. Lastly, it will be understood that the term "about" with regard to any of the particular numbers and ranges described herein is used to designate values within standard error, equivalent function, efficacy, final loading, etc., as understood by those of skill in the art with relevant conventional techniques and processes for formulation and/or utilizing compounds and compositions such as those described herein. As such, the term "about" may designate a value within 10, alternatively within 5, alternatively within 1, alternatively within 0.5, alternatively within 0.1, % of the enumerated value or range.

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

The invention claimed is:

1. A method of preparing a coated article, the method comprising:
   providing a substrate bearing a partially-dehydrated aqueous coating layer thereon;
   providing a coating composition for overspray-free application, the coating composition being a waterborne fluid that exhibits a near-Newtonian viscosity profile and a shear viscosity of less than 500 mPa*s at all shear rates from 0.1/s to 10/s, and comprises water, a binder, a crosslinker, and a thickener;
   providing the coating composition to a high transfer efficiency applicator, the high transfer efficiency applicator comprising a plurality of nozzles each being configured to apply a stream of the coating composition to the substrate substantially without atomization; and applying the coating composition to the substrate with the high transfer efficiency applicator via disposing a plurality of lines of the coating composition onto the partially-dehydrated aqueous coating layer of the substrate via the plurality of nozzles, thereby forming an overspray free coating layer thereon.

2. The method of claim 1, wherein applying the coating composition to the substrate comprises disposing partially-overlapping successive stripes of the coating composition onto the substrate to form a continuous wet film; wherein the method further comprises conditioning the wet film via at least partially flashing and/or dehydrating to give the overspray free coating layer; and wherein: (i) the wet film is substantially free from visible sag; (ii) the overspray free coating layer is substantially free from visible stripe overlap defects; or (iii) both (i) and (ii).

3. The method of claim 1, wherein the partially-dehydrated aqueous coating layer of the substrate is further defined as a partially dehydrated waterborne basecoat layer; and wherein the method further comprises preparing the partially dehydrated waterborne basecoat layer by applying a film of a waterborne basecoat on the substrate and then conditioning the film of the waterborne basecoat to form the partially dehydrated waterborne basecoat layer.

4. The method of claim 3, wherein applying the waterborne basecoat to the substrate comprises applying the film of the waterborne basecoat onto a partially dehydrated aqueous primer layer via a wet-on-wet process.

5. The method of claim 4, further comprising preparing the partially dehydrated aqueous primer layer on the substrate by disposing a film of a waterborne primer on the substrate, and conditioning the film of waterborne primer to give the partially dehydrated aqueous primer layer.

6. The method of claim 1, further comprising:
disposing a film of a clear coat on the overspray free coating layer; and
curing the clear coat to form a clear coat layer on the overspray free coating layer.

7. The method of claim 6, wherein applying the coating composition to the substrate gives a film of the overspray free coating composition, wherein the method further comprises conditioning the film of the overspray free coating composition to give a partially dehydrated aqueous overspray free coating layer, and wherein disposing the film of the clear coat comprises applying the clear coat to the partially dehydrated aqueous overspray free coating layer via a wet-on-wet process.

8. The method of claim 1, wherein the coating composition exhibits a shear viscosity of less than 200 mPa*s at all shear rates from 0.1/s to 10/s.

9. The method of claim 1, wherein the coating composition exhibits a shear viscosity of from 30 to 200 mPa*s at all shear rates from 0.1/s to 10/s.

10. The method of claim 1, wherein the near-Newtonian viscosity profile of the coating composition comprises a viscosity ratio ($0.1^{-1}/10\ s^{-1}$) of shear viscosity at a shear rate of 0.1/s to shear viscosity at a shear rate of 10/s of less than 10.

11. The method of claim 1, wherein the near-Newtonian viscosity profile of the coating composition comprises a viscosity ratio ($0.1 s^{-1}/100\ s^{-1}$) of shear viscosity at a shear rate of 0.1/s to shear viscosity at a shear rate of 100/s of less than 40.

12. The method of claim 1, wherein the coating composition exhibits a viscosity recovery of at least 60% within 30s following exposure to a shear rate 12,000/s.

13. The method of claim 1, wherein the coating composition exhibits a viscosity recovery of at least 60% within 2s following exposure to a shear rate 12,000/s.

14. The method of claim 1, wherein the binder comprises: (i) an acrylic resin; (ii) a polyester resin; (iii) a polyurethane resin; or (iv) any combination of (i)-(iii).

15. The method of claim 1, wherein the thickener comprises: (i) an organic thickener; (ii) an inorganic thickener; or (iii) both (i) and (ii).

16. The method of claim 1, wherein the thickener comprises an associative organic thickener comprising a hydrophobically modified ethylene oxide-urethane copolymer (HEUR).

17. The method of claim 1, wherein the thickener comprises an inorganic thickener comprising a phyllosilicate.

18. The method of claim 1, wherein the plurality of lines are applied to the substrate in a direction (X) along the substrate wherein each line partially overlaps with an adjacent line to form an overlap region and a non-overlap region.

19. The method of claim 18, wherein the overspray free coating layer is substantially free from visible stripe overlap defects.

20. The method of claim 18, wherein the overlap region is visually smooth such that there is less than an about 1 micron variation in thickness of the overlap region as compared to the thickness of the non-overlap region, as measured after curing of the overspray free coating layer, as measured over a 5 mm distance measured perpendicularly to the direction (X).

* * * * *